US009083703B2

(12) United States Patent
Fiducia et al.

(10) Patent No.: US 9,083,703 B2
(45) Date of Patent: Jul. 14, 2015

(54) MOBILE ENTERPRISE SMARTCARD AUTHENTICATION

(71) Applicant: LOCKHEED MARTIN CORPORATION, Bethesda, MD (US)

(72) Inventors: Kyle J. Fiducia, Orlando, FL (US); Jordan Faulkner Thomas, Montgomery Village, MD (US); Pierce Stephen Schmerge, Herndon, VA (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 150 days.

(21) Appl. No.: 13/852,800

(22) Filed: Mar. 28, 2013

(65) Prior Publication Data

US 2013/0297933 A1 Nov. 7, 2013

Related U.S. Application Data

(60) Provisional application No. 61/617,239, filed on Mar. 29, 2012.

(51) Int. Cl.
*H04L 29/06* (2006.01)
*H04W 12/06* (2009.01)

(52) U.S. Cl.
CPC ........ *H04L 63/0853* (2013.01); *H04L 63/0823* (2013.01); *H04W 12/06* (2013.01); *H04L 2463/082* (2013.01)

(58) Field of Classification Search
CPC ............ H04L 63/0823; H04L 63/0272; H04L 9/3247; H04L 9/3263; H04L 2209/56
See application file for complete search history.

(56) References Cited

U.S. PATENT DOCUMENTS

| 8,245,292 | B2 | 8/2012 | Buer | |
|---|---|---|---|---|
| 8,341,714 | B2 | 12/2012 | Muller et al. | |
| 2003/0012382 | A1* | 1/2003 | Ferchichi et al. | 380/270 |
| 2003/0115142 | A1 | 6/2003 | Brickell et al. | |
| 2003/0237004 | A1* | 12/2003 | Okamura | 713/201 |
| 2004/0268142 | A1* | 12/2004 | Karjala et al. | 713/200 |
| 2008/0022043 | A1 | 1/2008 | Adams et al. | |
| 2008/0046750 | A1 | 2/2008 | Fletcher et al. | |
| 2009/0193264 | A1 | 7/2009 | Fedronic et al. | |
| 2009/0245507 | A1* | 10/2009 | Vuillaume et al. | 380/28 |
| 2009/0265776 | A1 | 10/2009 | Baentsch et al. | |
| 2010/0098246 | A1* | 4/2010 | Ward | 380/44 |
| 2010/0122082 | A1 | 5/2010 | Deng et al. | |
| 2010/0138666 | A1 | 6/2010 | Adams et al. | |

(Continued)

*Primary Examiner* — Andrew Nalven
*Assistant Examiner* — Mary Li
(74) *Attorney, Agent, or Firm* — Marsh Fischmann & Breyfogle LLP

(57) ABSTRACT

Utilities that allow for multi-factor authentication into an enterprise network with a smart card using mobiles devices (e.g., smartphones, tablets, etc.), where almost any application (app) or website that accesses enterprise resources can be launched or executed to automatically establish of a VPN connection with the enterprise network free of necessarily having to specially configure the apps or websites to be useable with smart cards, card readers, etc. Virtually any app can be used and take advantage of the multifactor authentication free or substantially free of modification to the app itself as the disclosed utilities may take advantage of the native VPN clients and capabilities provided with the mobile device operating system (OS) (e.g., Android®, iOS). As a result, a much more flexible solution may be provided that allows the use of commercially available apps (e.g., from an "App Store") as well as, for instance, enterprise developed apps.

19 Claims, 27 Drawing Sheets

(56) References Cited

U.S. PATENT DOCUMENTS

| | | |
|---|---|---|
| 2010/0140348 A1 | 6/2010 | Adams et al. |
| 2011/0314515 A1 | 12/2011 | Hernoud et al. |
| 2012/0072979 A1 | 3/2012 | Cha et al. |
| 2013/0346745 A1 * | 12/2013 | Broch .......................... 713/156 |

* cited by examiner

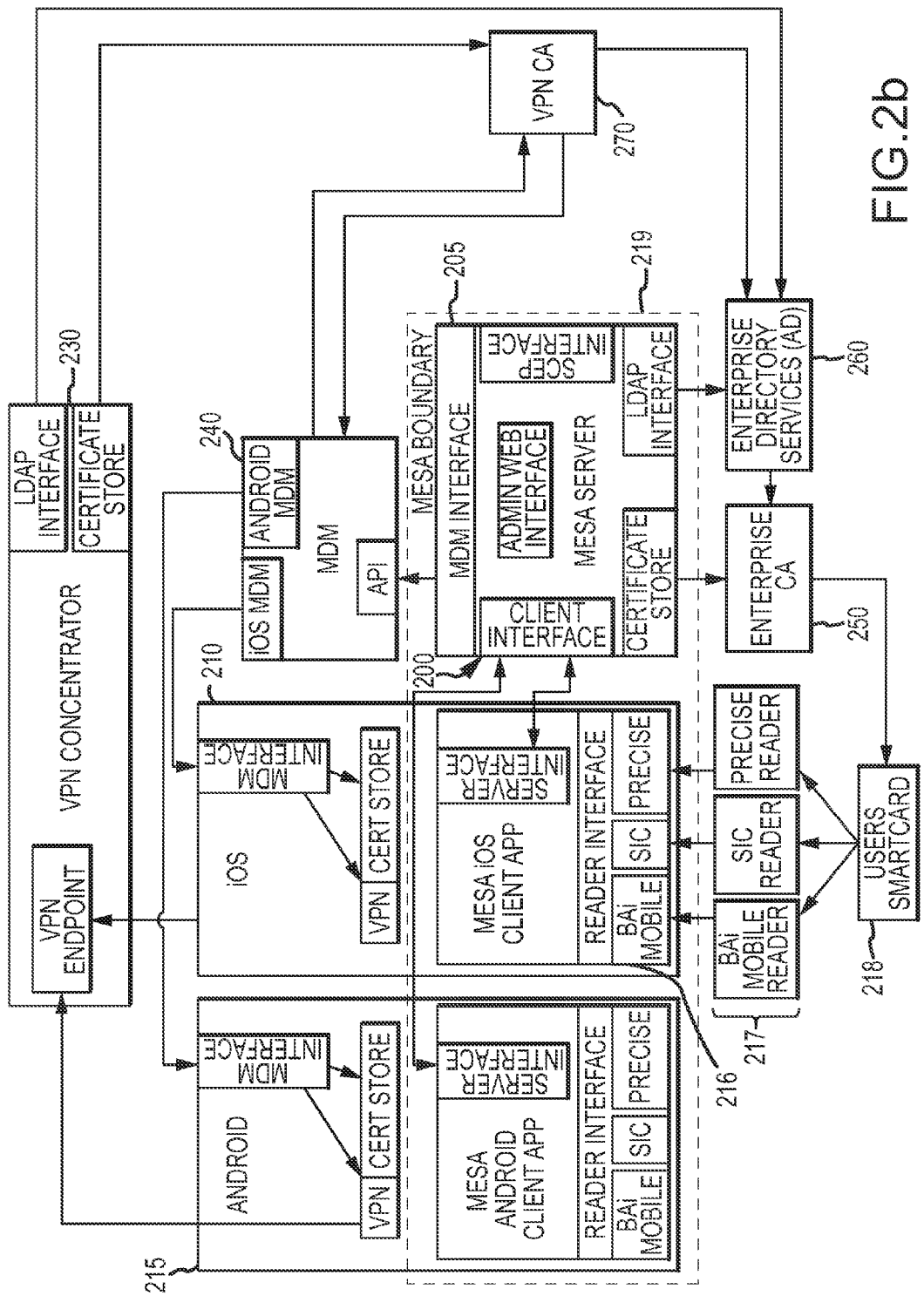

OPEN MESA APP

SUCCESS. INSTALLING TEMP VPN PROFILE

CONFIRM

INSTALLED

ENTER CITRIX PASSWORD

LOGGING IN

CITRIX LOGGED IN

MOBILE ENTERPRISE SMARTCARD AUTHENTICATION

CROSS-REFERENCE TO RELATED APPLICATION

This application claims priority to U.S. Ser. No. 61/617,239, entitled "Mobile Enterprise Smartcard Authentication," and filed on Mar. 29, 2012, the entire contents of which are incorporated herein as if set forth in full.

FIELD OF THE INVENTION

The present invention relates generally to multi-factor authentication and, more particularly, to multi-factor authentication into an enterprise network from a mobile device using a smart card.

BACKGROUND OF THE INVENTION

Multi-factor authentication (e.g., two-factor authentication, TFA, T-FA or 2FA) is an approach to authentication which requires the presentation of two or more of three authentication factors (e.g., a knowledge factor or "something the user knows", a possession factor or "something the user has", and an inherence factor or "something the user is") for purposes of confirming the identity of a person or software program. As a simple example in the context of a bank customer utilizing an automated teller machine (ATM), one authentication factor is the physical ATM card the customer slides into the machine (a possession factor) while the second factor is the personal identification number (PIN) the customer enters through the keypad (a knowledge factor). Corroboration of both of these authentication factors leads to authentication of the customer and access to his or her account for purposes of withdrawing currency.

In the context of a user accessing an enterprise network (e.g., for purposes of accessing an email server or other enterprise applications) via a mobile device (e.g., smartphone, tablet, etc.) over a Virtual Private Network (VPN) connection or the like, for instance, multi-factor authentication is sometimes used to verify a user's identity to the enterprise (e.g., as an employee of the enterprise). Specifically, the authentication factors may be a user name and password (the knowledge factor) and one or more "soft tokens" (the possession factor). In relation to the latter factor, for instance, a user's smart phone may be loaded with an application that generates authentication soft tokens for purposes of accessing the enterprise network.

SUMMARY OF THE INVENTION

One problem with existing mobile devices (e.g., Android® and Apple® iOS smartphones and tablets) is their inherent limitations in relation to multi-factor authentication using smart cards (e.g., Common Access Cards (CACs), Personal Identity Verification (PIV) cards, chip cards, integrated circuit cards (ICCs), etc.) into enterprise networks using VPN technology. As an example, many military and governmental agencies maintain policies stipulating use of smart cards by military and civilian personnel for purposes of authenticating the holder's identity (e.g., upon entering a particular secured environment). For instance, a smart card may employ public key infrastructure (PKI) by storing an encrypted digital certificate (e.g., identity certificate) issued from a particular PKI provider that binds a public key to the person in whose name the smart card was issued along with other relevant information.

However, military and civilian personnel (and other users of smart cards) are generally limited in their ability to be able to launch a wide variety of applications (e.g., also referred to herein as "apps" or singularly as an "app") on their government-issued and/or personal mobile devices that access their respective enterprise network over a VPN connection using their respective personal smart cards as part of a multi-factor authentication into the enterprise network. Some existing product suites include smart card readers that are interconnectable with mobile devices. The smart card readers are designed to obtain a user's identity certificate as part of a multi-factor authentication into a particular enterprise website or with respect to a particular application that accesses an enterprise network.

For instance, a user may initially insert the user's smart card into the card reader, insert the card reader into a mobile device, and then launch any appropriate reader application on the mobile device designed to retrieve the user's identity certificate from the smart card (a first authentication factor). Thereafter, the user may launch an application or navigate to a particular website (e.g., to access an enterprise email server) whereby the user may be required to enter a PIN or the like (a second authentication factor) before access to the enterprise network is granted.

However, the aforementioned websites and applications typically must be specifically designed to function in conjunction with smart cards (e.g., with a smart card reader app) which necessarily limits the number and type of available apps and websites that access enterprise network resources. Stated differently, existing applications and websites that require multi-factor authentication with smart cards (e.g., for encrypted data transfers) typically must be specifically configured for use with smart cards or card readers which necessarily slows down the release and deployment of such applications and websites for use by enterprise users and the like.

In this regard, disclosed herein are methods, processes, systems and the like (utilities) that allow users to multifactorially authenticate to an enterprise network with a smart card using their mobiles devices (e.g., smartphones, tablets, etc.), where almost any user app or website that accesses enterprise resources can be launched or otherwise executed to cause the automatic establishment of a VPN connection with the enterprise network free of necessarily having to specially design or configure the apps or websites to be useable with smart cards, card readers, etc. As the disclosed utilities may utilize the native VPN clients and capabilities provided with the mobile device operating system (OS) (e.g., Android®, iOS), virtually any app can be used and take advantage of the multifactor authentication free or substantially free of modification to the app itself. As a result, a much more flexible solution may be provided that allows the use of commercially available apps (e.g., from an "App Store") as well as, for instance, enterprise developed apps. Furthermore, some arrangements envision that only the VPN configuration and the disclosed utilities may need to be accredited rather than individual apps with their own security implementations to ease the authorization and employment of a secure mobile solution in an enterprise.

As will be discussed herein, users may insert their smart cards into (or otherwise link with) any appropriate smart card readers (e.g., a card holder with dongle, phone case, tablet shoe, etc.) electrically connected with their mobile devices to implement or initiate the utilities disclosed herein. In some instances, the utilities disclosed herein may be referred to as "Mobile Enterprise Smartcard Authentication" (MESA)

utilities or the like. In any event, the MESA utilities disclosed herein may take advantage of some existing enterprise mobility or mobile device management (MDM) solutions (e.g., MDM solutions by AirWatch®, LLC of Atlanta, Ga.; FixMo® of Sterling, Va.; MobileIron® of Mountain View, Calif.; Symantec™ of Mountain View, Calif.) to provision mobile devices with VPN certificates (e.g., derived soft credentials) and configuration information. The disclosed utilities may also use enterprise Public Key Infrastructure (PKI) components such as Certificate Authorities (CA) and directory services to validate certificates and permissions.

In conjunction with (e.g., either before or after) interconnection of a smart card and card reader with the user's mobile device, a user may launch a MESA application (referred to herein as the "MESA App") on their mobile device that is designed to implement or initiate at least some of the authentication utilities and functionalities disclosed herein. In one arrangement, the MESA App may be configured to automatically launch upon detection of the inserted smart card and card reader. Once the MESA App has been opened, the user may choose to begin an authentication process and provide his or her PIN (and/or other credentials such as a username, password, etc.) which may be verified/validated by the MESA App and/or in other manners.

The MESA App may then appropriately extract the user's digital or identity certificate and digital signature (the latter being generated by the smart card with a private key in the smart card after correct entry of the PIN) from the inserted smart card (e.g., via the card reader) and send the extracted identity certificate and digital signature to a MESA Server that requests validation of the same from an enterprise CA (e.g., confirmation that the identity certificate is not expired and/or revoked). In addition to validation of the identity certificate and digital signature, the user's user information (e.g., username) may be extracted from the identity certificate and then validated against enterprise directory services to confirm the user's access to the enterprise network via a VPN connection (e.g., validating the user's network permissions). For instance, the MESA Server may form part of the enterprise network and be the arbiter of whether a user is who he/she says he/she is and whether the user is allowed access to the enterprise network.

Assuming the user has permissions, the MESA Server may generate and pass a corresponding VPN digital certificate request to a PKI/VPN CA which appropriately generates a certificate (e.g., valid for a period of time, such as a specified, short period of time) and returns the same to the MESA Server. For instance, the VPN certificate may be a derived credential from the user's original identity certificate which is only to be used for a single session. The MESA Server may then pass the VPN certificate along with any appropriate VPN configuration parameters (e.g., VPN server, VPN type, on demand address/name space, etc.) to another (e.g., second) server (e.g., an MDM server) which broadly oversees installation and removal of the VPN certificate and a corresponding VPN configuration profile on the user's mobile device. For instance, the second server may confirm that the user's mobile device is valid/authorized, generate the VPN configuration profile (e.g., based on configuration details received from the MESA Server), and send the VPN certificate and configuration profile to the user's mobile device for installation thereon (e.g., via sending the same to an interface of the mobile device). Instead of the MESA Server sending the VPN digital certificate request to the PKI/VPN CA, the MESA Server may, in one arrangement, send the request to the MDM server which may then carry out both the actual VPN digital certificate request to the PKI/VPN CA and the provisioning of the mobile device in relation to installation of the VPN certificate.

After the user has been informed in any appropriate manner that authentication was successful (e.g., an "Authentication Successful" pop-up message on the mobile device, an audible tone, etc.), the user may navigate to one or more desired websites and/or launch one or more desired apps (e.g., Citrix, etc.) on his or her mobile device that, in one arrangement, access a network resource within a defined on demand address/name space. More specifically, the VPN configuration profile specified by the MESA Server and/or MDM server may define a particular address or domain space that, when access is attempted thereinto (e.g., via an app), may automatically trigger the activation of a VPN connection. For instance, if a VPN configuration profile specified "On Demand=*.securedomain.net," then a VPN connection would activate whenever a user attempted to access any server in such domain (e.g., such as www.securedomain.net). As another example in the context of an IP network, specifying "10.37.*.*" would cause anything in that wildcard to trigger connection of a VPN.

In any event, launching of an app may cause the VPN into the enterprise network to automatically connect (which may involve validating the VPN certificate and any user VPN permissions in any appropriate manner before the VPN connection is fully established). The user may continue to access one or more apps or websites that make use of the enterprise network via one or more respective VPNs as may be required by their job. Each VPN connection may remain active when an app or website is using it and may automatically disconnect and reconnect as needed.

When a user has completed his or her work, the user can choose to de-authenticate in the MESA App and/or remove their smart card from the card reader (e.g., either being configurable via policy) to end the one or more VPN sessions. Additionally, at the end of the session time, the VPN certificate may expire, active VPNs may end automatically and may not reconnect, and the MESA server may request that the second server (e.g., the MDM server) removes the configuration profile and the certificate (e.g., also being configurable via policy). In one arrangement, the user may be prompted (e.g., shortly before the session end time) to re-authenticate, and doing so may cause the preceding process to be re-iterated to re-provision the mobile device for an additional period of time. In some embodiments, any appropriate biometric information (e.g., fingerprints, voice, etc.) may be appropriately incorporated into the disclosed utilities (e.g., with or without the use of smart cards or PINs) to allow for alternative and/or additional authentication factors.

In one aspect, a utility for use in multi-factor authentication to an enterprise network includes first receiving, at a user's mobile device (e.g., smartphone, tablet, laptop, etc.), an identity certificate and digital signature of the user (e.g., used to identify the user to an enterprise network) from a smart card connected with a reader interface of the mobile device; passing the identity certificate and digital signature from the mobile device to a central management server over at least one network; and third receiving, at the user's mobile device, a VPN certificate to access the enterprise network via a VPN connection in response to the passing.

Upon receipt of the VPN certificate, a VPN connection may be initiated using the VPN certificate. In one arrangement, the initiating may include launching an application on the user's mobile device and requesting validation of the VPN certificate in response to the launching, where the VPN connection may be initiated based on a result of the requesting. For instance, the VPN certificate may be sent from the mobile device (e.g., from pathways innate in the OS of the mobile device) to any appropriate VPN concentrator (e.g., Cisco ASA VPN Concentrator by Cisco Systems, Inc. of San Jose, Calif.) operable to validate the VPN certificate (e.g., via a PKI such as Online Certificate Status Protocol (OCSP), VA, or CA) or any corresponding VPN permissions (e.g., via an enterprise directory service). Before requesting validation of the VPN certificate, the user may be prompted to enter any appropriate credentials (e.g., username and/or password) into the mobile device which may be included in the validation request.

In another aspect, a utility for use in multi-factor authentication to an enterprise network includes receiving, at a management server over at least one network, credentials verifying at least two authentication factors from a user via a mobile device; first sending, from the management server to a first Certificate Authority (CA) server, a request to validate the credentials verifying at least one of the at least two authentication factors; and second sending, from the management server for receipt at a second CA server, a request for a certificate to access the enterprise network via a VPN connection. A VPN certificate is pushed from a Mobile Device Management (MDM) server to the mobile device when the at least two authentication factors are validated. For instance, the second sending may include the management server sending the VPN connection request directly to the second CA server or sending the request to the MDM server which may then be responsible for sending (at the direction of the management server) a VPN connection request to the second CA server.

In one arrangement, the utility may include third sending, from the management server to an enterprise directory server, a request to validate user permissions associated with the credentials verifying at least one of the at least two authentication factors, where the second sending is responsive to successful validation of the first and third sending. For instance, the VPN certificate may be received at the management server from the second CA server and the VPN certificate may then be transmitted to the MDM server. The transmitting may include communicating configuration settings for the VPN connection (e.g., profile name, VPN server, VPN type, on-demand address) to the MDM server, where the MDM server generates a VPN profile including the VPN connection configuration settings and pushes the VPN profile with the VPN certificate to the mobile device.

In another aspect, a multi-factor authentication system for allowing access to an enterprise network over a virtual private network (VPN) connection with a mobile device is disclosed. The system includes a client application configured to run on a user's mobile device and executable by a processor of the mobile device to first receive an identity certificate of the user from a smart card connected with a reader interface of the mobile device and second receive a and digital signature of the user. The system also includes a central management server of the enterprise network in communication with the client application over at least one network. The central management server is configured to receive the identity certificate from the client application via at least one network, first send a request to a first Certificate Authority (CA) server to validate the identity certificate, and second send a request for a VPN certificate (a derived credential) from a second CA server that allows the mobile device to establish a VPN connection into the enterprise network by the mobile device.

Various refinements exist of the features noted in relation to the various aspects of the present invention. Further features may also be incorporated in the various aspects of the present invention. These refinements and additional features may exist individually or in any combination, and various features of the various aspects may be combined. These and other aspects and advantages of the present invention will be apparent upon review of the following Detailed Description when taken in conjunction with the accompanying figures.

DESCRIPTION OF THE DRAWINGS

For a more complete understanding of the present invention and further advantages thereof, reference is now made to the following Detailed Description, taken in conjunction with the drawings, in which:

FIG. 2b is a system diagram illustrating the components of FIG. 1 in more detail, according to another embodiment.

DETAILED DESCRIPTION

Figure 1:
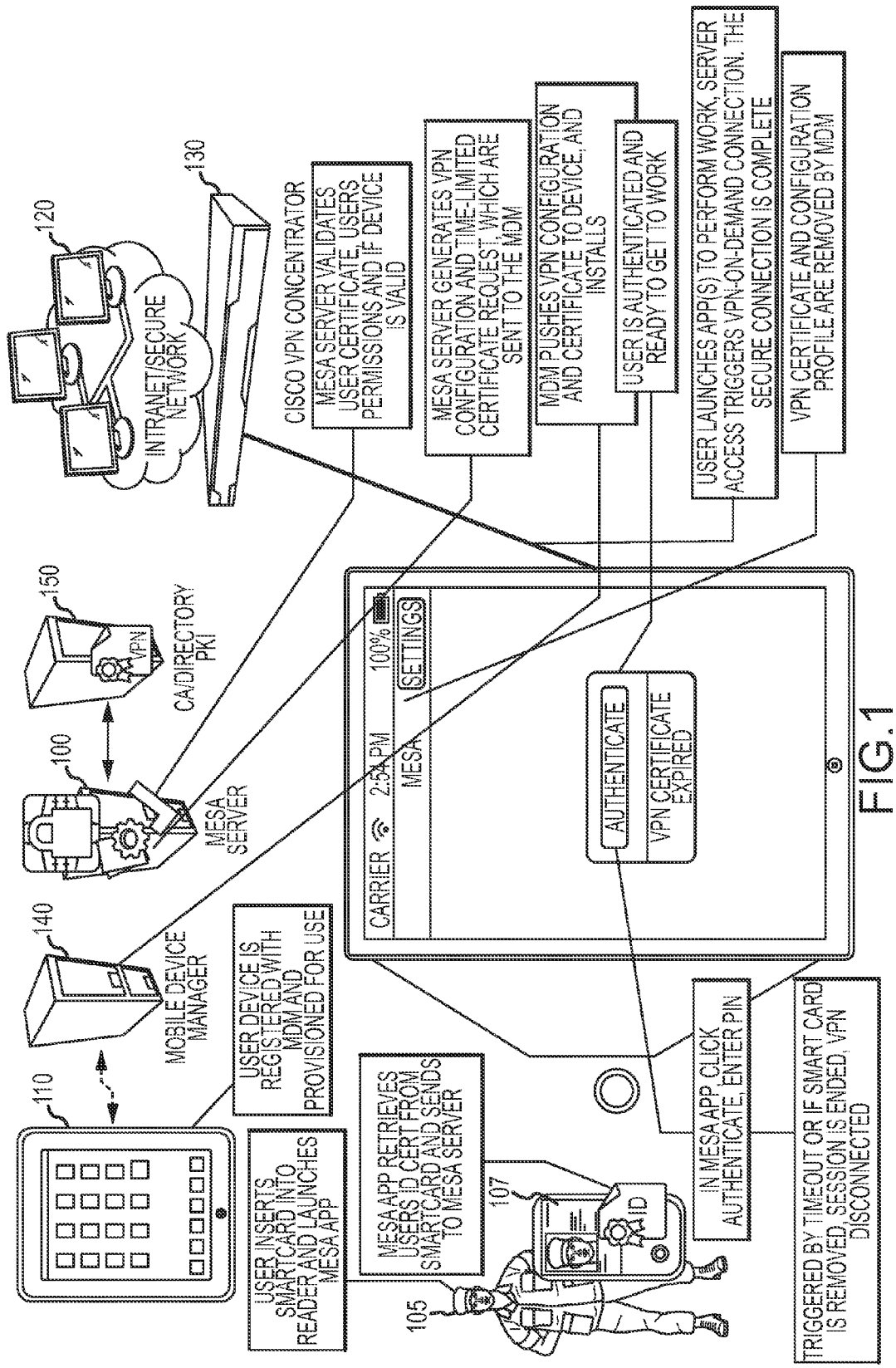
FIG. 1 is a schematic representation providing a broad overview of a number of components (e.g., mobile devices, servers, networks, etc.) involved in the MESA utilities disclosed herein.

FIG. 1 is a schematic representation broadly illustrating a number of components involved in a MESA process that allows a user 105 (via the user's mobile device 110) to securely access at least one secure network/Intranet 120 (e.g., enterprise LAN) over a VPN connection. At the center of the MESA arrangement may be a MESA server 100 (e.g., central management server, linking server) that is broadly operable to receive/retrieve and validate a user's identity certificate from a smart card 107 interconnected with the mobile device 110 and coordinate the request for generation of a corresponding VPN certificate to be used by the mobile device 110 to initiate a VPN connection with the enterprise network 120.

Upon the user 105 inserting the user's smart card 107 (e.g., CAC card) into a reader interface or card reader (not labeled) of the mobile device 110, a MESA app (not labeled in FIG. 1) on the mobile device 110 may retrieve the user's identity certificate from the smart card 107 (e.g., in addition to any other appropriate information) and passes the same to the MESA server 100 over any appropriate network(s) (e.g., Internet). In addition to the identity certificate, for instance, the MESA app may also extract a digital certificate from the smart card as well as any appropriate ID of the mobile device 110 and pass such information along with the identity certificate to the MESA server 100. Thereafter, the MESA server 100 may validate the user's identity certificate and any appropriate user permissions against CAs and directory services 150 (e.g., an enterprise CA and enterprise AD) and then seek request a VPN certificate (e.g., from a VPN CA). The MESA server 100 may then pass the VPN certificate and any appropriate VPN configuration information to an MDM server 140 which eventually pushes (assuming validation) the same to the mobile device 110 for installation thereon whereupon the user 105 may be authenticated and ready to get to work. In one arrangement, the MESA server 100 may send the VPN certificate request and VPN configuration information to the MDM server 140 which may then request (e.g., at the direction of the MESA server 100) and receive the VPN certificate from the VPN CA.

When the user 105 then launches one or more apps (not labeled) on the mobile device 110 (e.g., apps that need access to the enterprise network 120), the VPN certificate and a VPN profile (based on the VPN configuration information) are used to initiate a VPN on-demand connection with the enterprise network 120 and the secure connection is complete. In one arrangement, a VPN concentrator 130 may be used as part of the VPN connection initiation to validate the VPN certificate and any user VPN permissions and then grant access to the resources of the enterprise network. Upon the smart card 107 being removed from the mobile device 107, a session timing out, etc., the VPN certificate and configuration profiles may be removed by the MDM server 140 and the VPN connection may be disconnected.

Figure 2A:
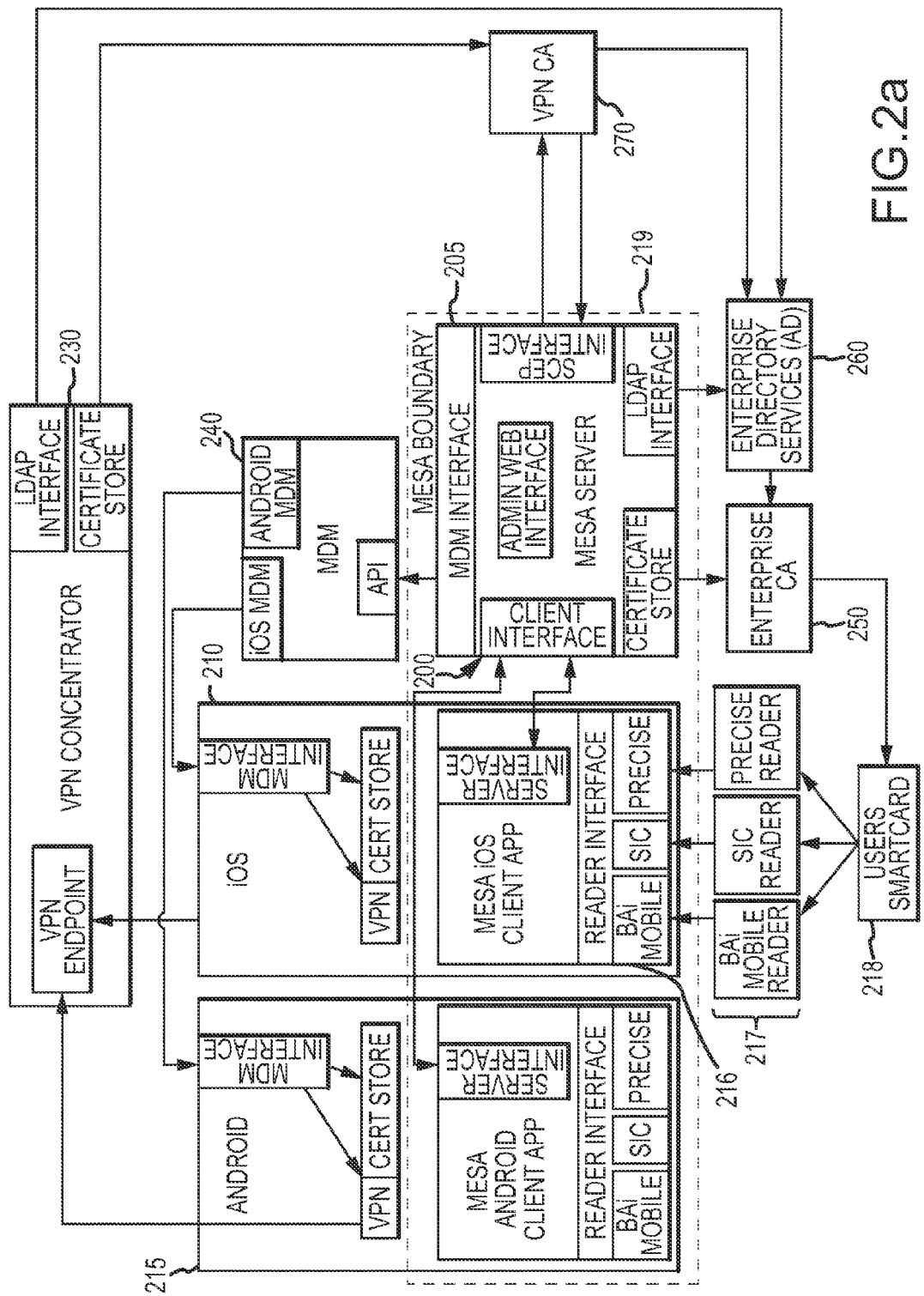
FIG. 2a is a system diagram illustrating the components of FIG. 1 in more detail, according to one embodiment.

Turning now to FIG. 2a, a more detailed system diagram of the MESA setup of FIG. 1 is illustrated. In conjunction with a discussion of the system diagram of FIG. 2a, reference will also be made to FIG. 3 which is a flow or swim lane diagram illustrating steps that may be performed in performing a multi-factor authentication process 300 to enterprise networks using smart cards and VPN technology. At 310 in FIG. 3, the process 300 may include passing at least two authentication factors such as at least two of an identity certificate (e.g., CAC ID from a CAC card), a mobile device ID, a user PIN, biometric information (e.g., from a fingerprint reader), and the like from a mobile device to a MESA server.

With reference to FIG. 2a, for instance, a user may insert a smart card 218 (e.g., CAC ID) into (or otherwise establish a wired or wireless connection with) a card reader 217 (e.g., baiMobile™ Bluetooth Smart Card reader, SIC reader, Precise reader) electrically interconnected or otherwise associated with a mobile device 210 and/or 215 and choose to begin a multi-factor authentication process via the launching of a MESA app 216 (e.g., via tapping, clicking, etc. a MESA app icon on the screen of the mobile device 210). In one arrangement, the MESA app 216 may be configured to automatically launch upon detection of the inserted smart card 218 and card reader 217.

Upon beginning the authentication process, the MESA app 216 may prompt the user to enter a first authentication factor such as a PIN. Upon successful entry of the PIN (e.g., which may be validated by the smart card 218, the validation of which may be communicated from the smart card 218 to the MESA app 216), the MESA app 216 may retrieve the identity certificate (e.g., in addition to the user's username and/or other information) from the smart card 218 (e.g., via the card reader 217 and/or any appropriate reader interfaces (not labeled)) and then pass the same to a MESA server 200 (e.g., via respective server and client interfaces (not numbered) of the MESA app 216 and MESA server 200). As shown, the MESA server 200 and MESA app 216 (and other MESA Apps on other mobile devices, such as mobile device 215) may form a "MESA boundary" 219.

Turning back to FIG. 3, the process 300 may include passing 320 requests to validate the identity certificate and any appropriate user permissions to an enterprise CA and directory services. With reference to FIG. 2a, for instance, the MESA server 200 may pass a request to an enterprise CA server 250 to validate the identity certificate received from the MESA app 216 (or otherwise validate the identity certificate against data of the enterprise CA server 250). The MESA server 200 may also pass a request to enterprise directory services 260 (e.g., active directory (AD)) to validate any user permissions (or otherwise validate the identity certificate against data of the enterprise directory services 260), such as using an extracted userID.

For instance, the MESA server 200 may first use the identity certificate and digital signature received from the MESA app 216 to validate the user is who he/she says he/she is (e.g., two-factors issued by a trusted CA), extract credentials (e.g., a username), and then determines if the user is allowed to be provisioned with access to the enterprise network. In one arrangement, this may be done by checking group permissions in the directory services 260. In another arrangement, this may be done against any user permissions repository (e.g., Authentication, Authorization and Accounting (AAA) server). In the event that the identity certificate and/or user permissions fail to be validated, the MESA server 200 may receive a failed validation message (e.g., from the enterprise CA server 250 and/or enterprise directory services 260) which may be passed back to the MESA app 216 for display to a user.

Figure 3:
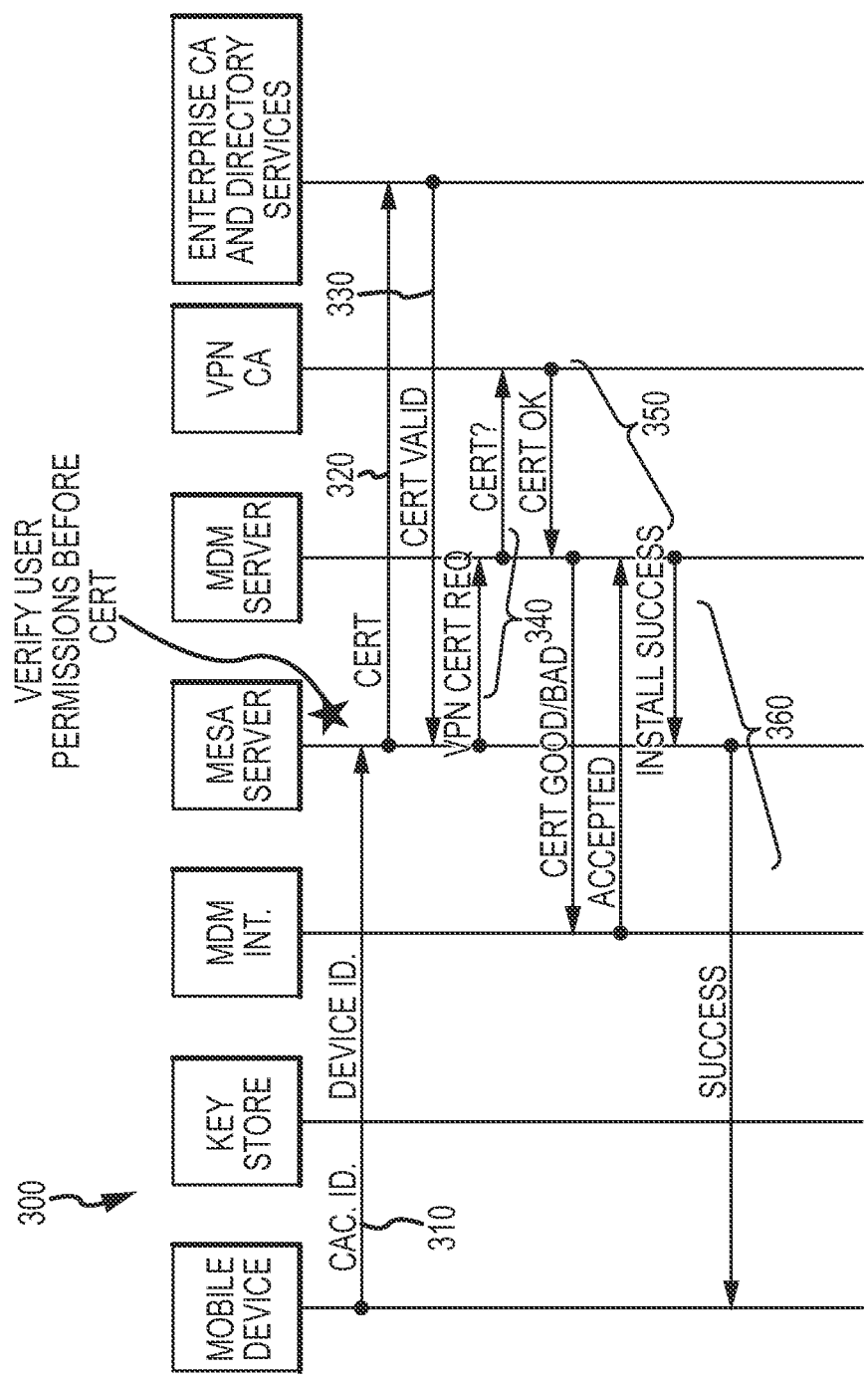
FIG. 3 is a flow diagram showing one manner in which a mobile device user may be authenticated to a network using the system of FIG. 2a or 2b.

In the event that the identity certificate and user permissions pass validation, the process 300 of FIG. 3 may include receiving 330, at the MESA server 200, validation of the identity certificate and user permissions; and then passing 340, from the MESA server to a VPN CA server, a request for a certificate to access the user's enterprise network (e.g., the enterprise network associated with the user's smart card) via a VPN connection (i.e., a "VPN certificate"). For instance, and as shown in FIG. 2a, the MESA server 200 may make a Simple Certificate Enrollment Protocol (SCEP) or other protocol request to a VPN CA server 270 (e.g., which may be disjoint from the enterprise CA server 250, may be subordinate to (or vice versa) or in trust with the enterprise CA server 250, may be the same as the enterprise CA server 250, etc.) for a corresponding VPN certificate (e.g., access credentials).

Upon determining that a VPN certificate is to be generated (e.g., which would typically occur by virtue of the identity certificate already having been validated by the enterprise CA server 250), the VPN CA 270 may generate a corresponding VPN certificate. In one arrangement, the VPN CA server 270 may initiate or coordinate the association of the created VPN certificate with the user (e.g., via the user's userID) in the enterprise directory services 260 (e.g., for use in subsequent validation of the VPN certificate or any user VPN permissions during initiation of a VPN connection).

Upon generation of the VPN certificate, the process 300 may include passing 350 the VPN certificate to an MDM server (e.g., via an MDM interface 205 of the MESA server 200) and then pushing 360 the VPN certificate from the MDM server to the mobile device 210. In one arrangement, and again with reference to FIG. 2a, the VPN CA server 270 may pass the VPN certificate back to the MESA server 200 (e.g., via a SCEP interface of the MESA server 200) which may then pass (e.g., via the MDM interface 205) the VPN certificate and associated VPN profile installation requests to an MDM server 240 (e.g., AirWatch™ server). For instance, the MESA server 200 may send a number of VPN configuration parameters (e.g., VPN server, VPN type, on-demand address/name space, etc.) to the MDM server 240 (along with the VPN certificate) for generation of a corresponding VPN profile (which contains information needed to actually connect to the enterprise network such as the address of a VPN concentrator 230 (discussed herein, such as below), protocols to use, etc.).

The MDM server 240 may then push the VPN certificate and profile (which may be associated with installation instructions) to an MDM interface 214 of the mobile device 210 for installation and/or storage on the mobile device 210. For instance, the MDM server 240 may include one or more interfaces (e.g., iOS MDM interface, Android MDM interface, not numbered) for use in communicating with a respective number of mobile device OSs (e.g., iOS, Android) via corresponding MDM interfaces 214. In one arrangement, the user may receive an "Install VPN certificate" or the like icon on the screen of the mobile device 210 that, when manipulated (e.g., tapped), may initiate installation of the VPN certificate and profile on the mobile device 210. Upon successful installation and/or storage of the VPN certificate and profile, the user may then initiate a VPN connection with the user's enterprise network to access data and/or services of the enterprise network. For instance, the user may launch almost any user app on the user's mobile device that may need to utilize or need access to resources/data of the enterprise network (e.g., even if the app has not been specifically designed or configured for use with multi-factor authentication using the smart card).

In one arrangement, the launching of the user app may automatically initiate establishment of the on-demand VPN connection. As an example, the VPN certificate and profile (which may include user VPN permissions) may be passed from the mobile device 210 (e.g., via native VPN clients/capabilities provided with the OS of the mobile device 210) to a VPN concentrator 230 which serves to request validation of the VPN certificate and any user VPN permissions from the VPN CA server 270 and enterprise directory services 260, respectively. For instance, the VPN permissions could specify the enterprise network resources that the user can access (e.g., user "A" can access server "X" on port "Y" on weekdays). Once authenticated, the authorized access may be dependent on the specified VPN permissions. The VPN permissions may be different based on any number of parameters such as user and/or the like. Upon validation, the VPN connection is established and the app can access resources/data of the enterprise network over the VPN connection (e.g., as if the app was actually accessing the resources/data from within the enterprise network). The user may continue to access one or more apps or websites that make use of the enterprise network via one or more respective VPNs. Each VPN connection may remain active when an app or website is using it and may automatically disconnect and reconnect as needed.

Requests to remove VPN profiles from the mobile device 210 (e.g., responsive to removal of the smart card 218 from the card reader 217) may be generated by the MESA app 216 and passed to the MESA server 200, whereby the MESA server 200 may send the removal request to the MDM server 240 (e.g., via the MDM interface 205). Removal instructions (e.g., removal of VPN certificate and/or profile) may be pushed to from the particular MDM interface of the MDM server 240 to the MDM interface 214 of the mobile device 210 for disconnection of the VPN session.

Figure 4A:
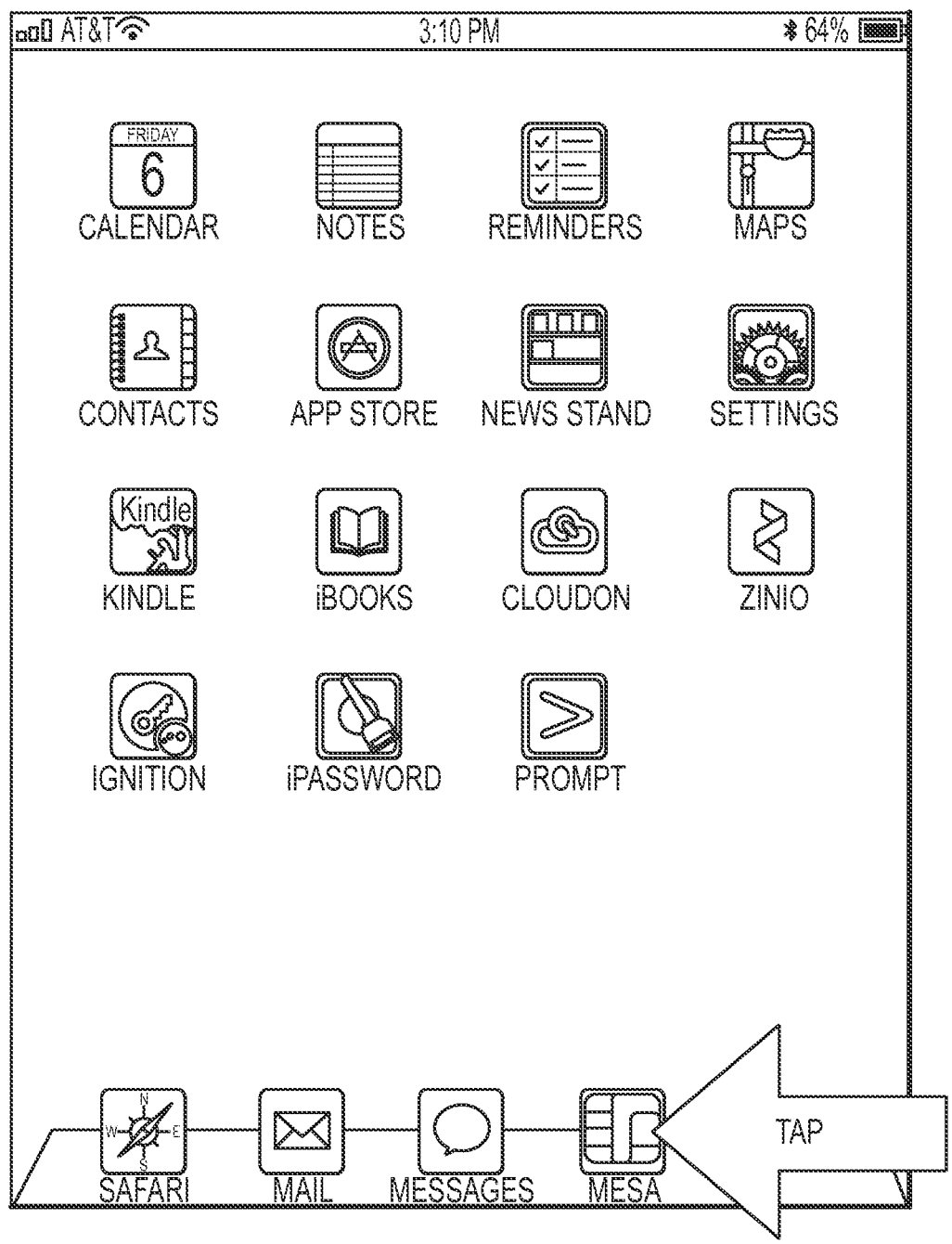
FIGS. 4a-4p are screenshots from a mobile device implementing the MESA utilities disclosed herein, according to one embodiment.
Figure 4B:
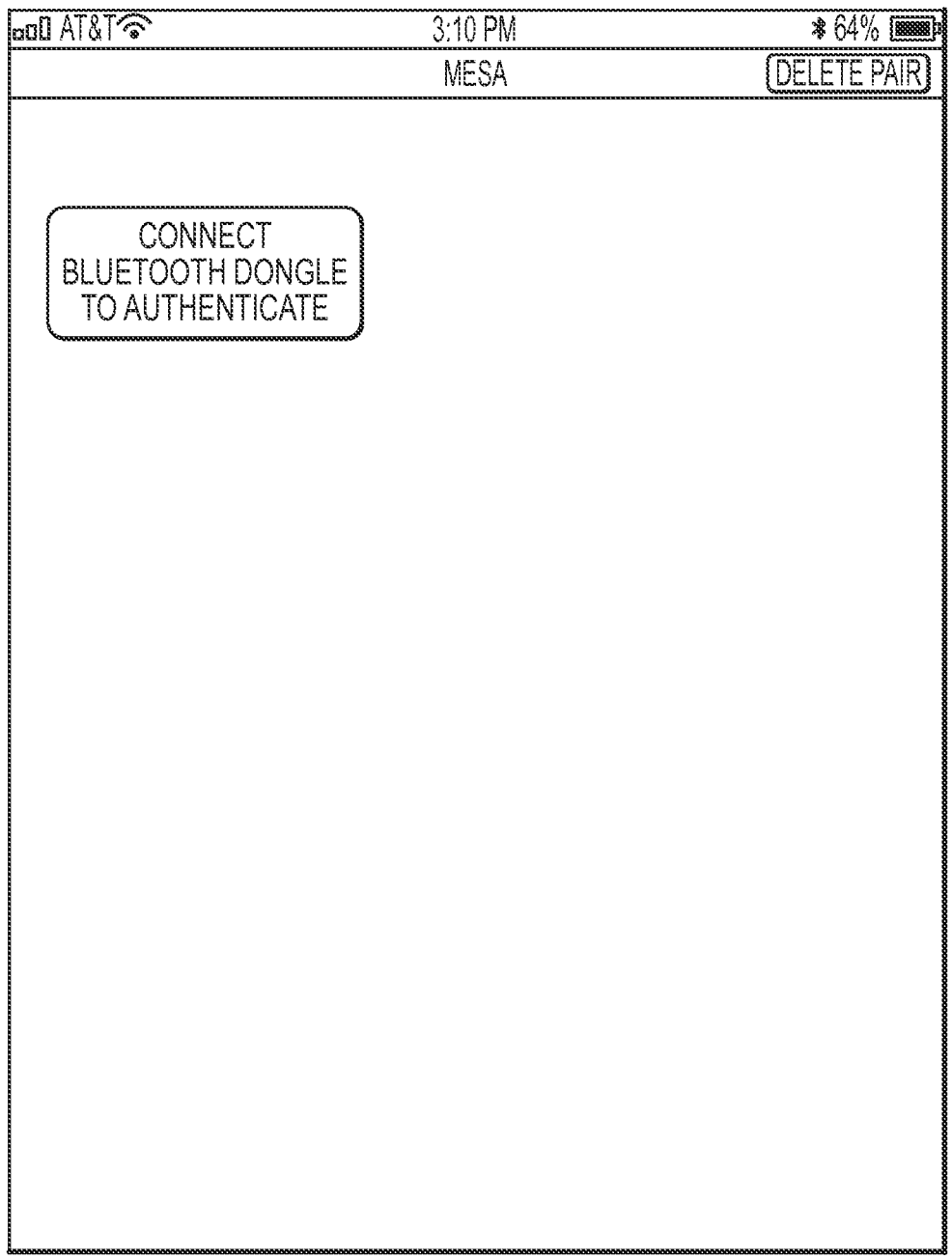
Figure 4C:
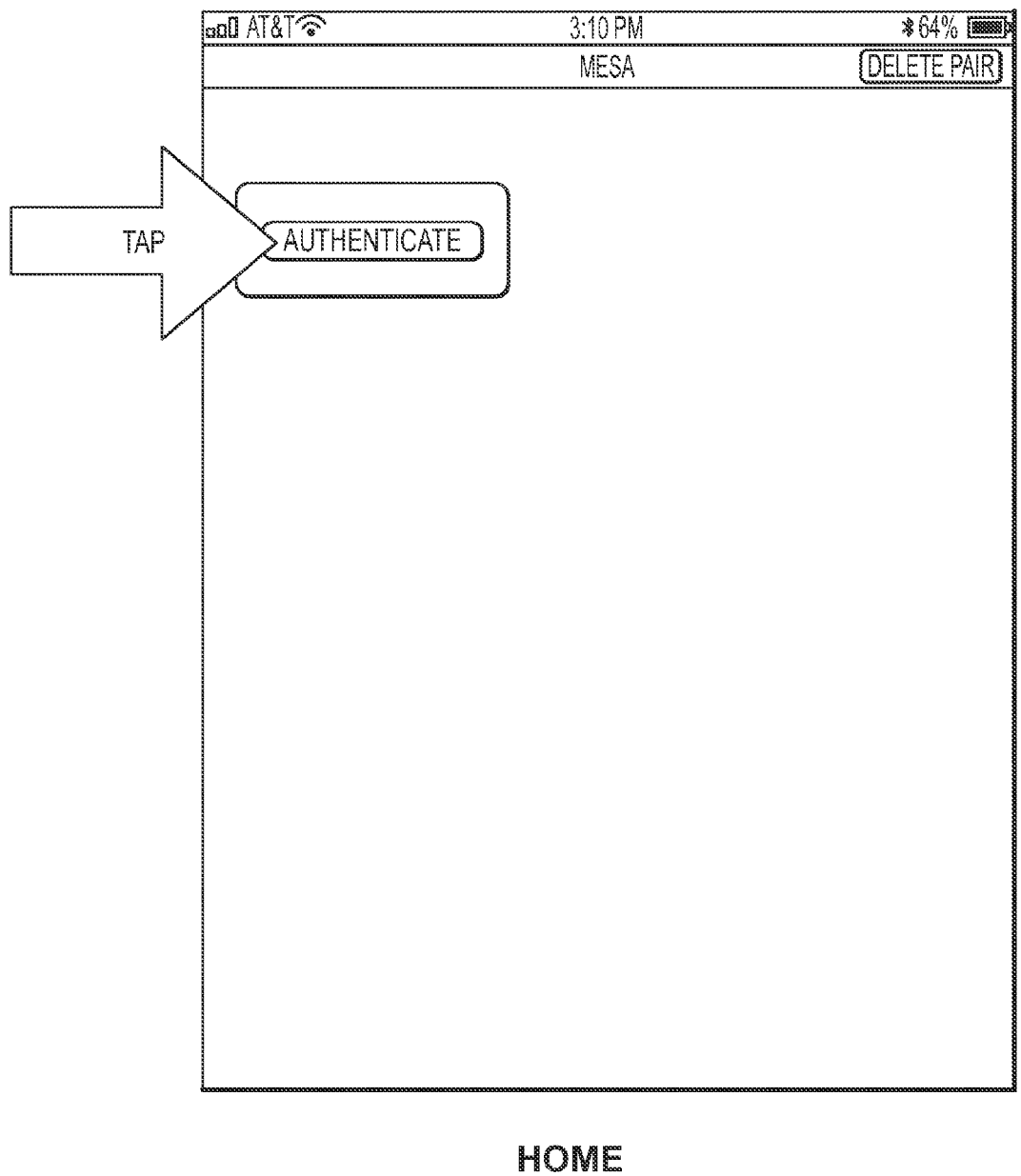
Figure 4D:
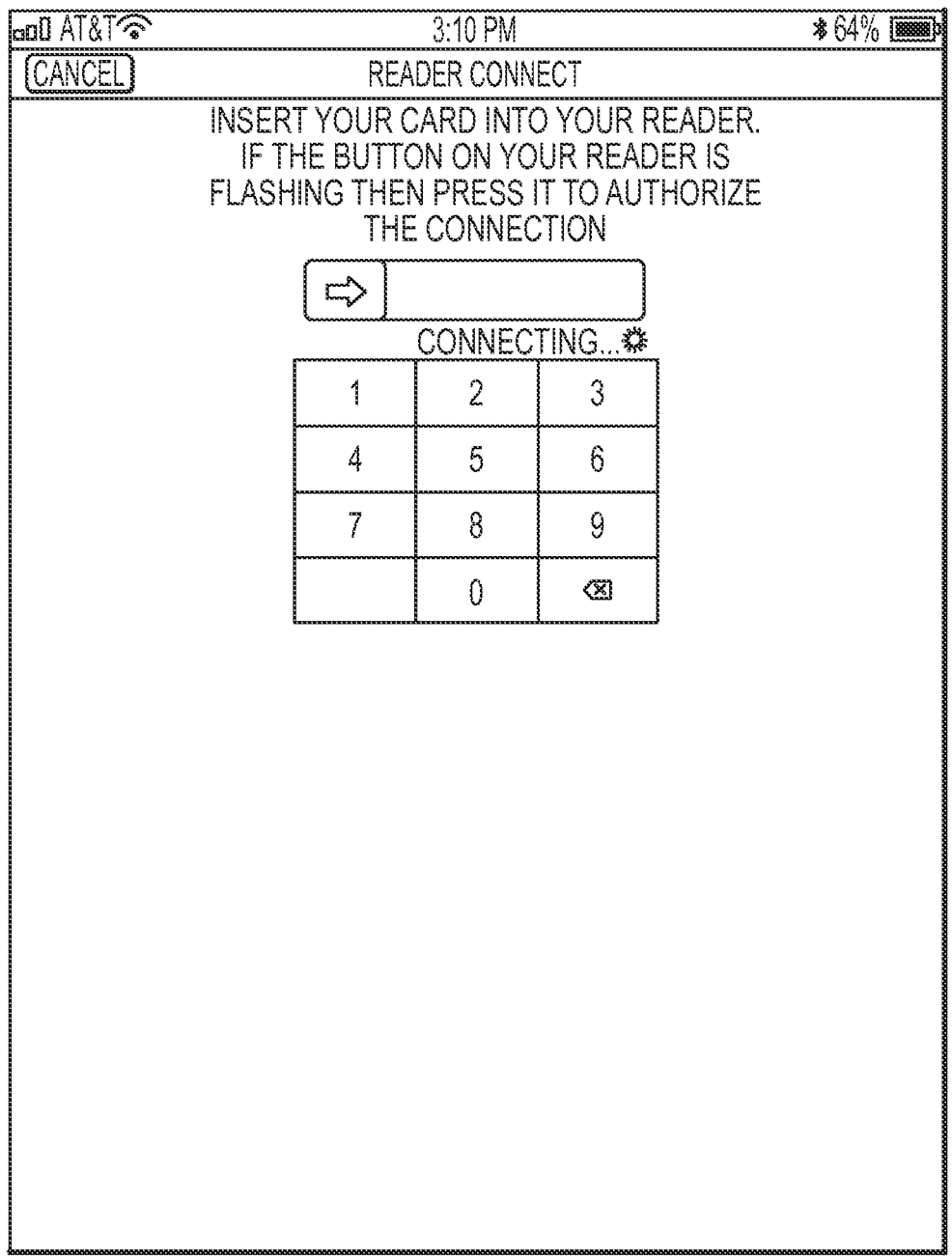
Figure 4E:
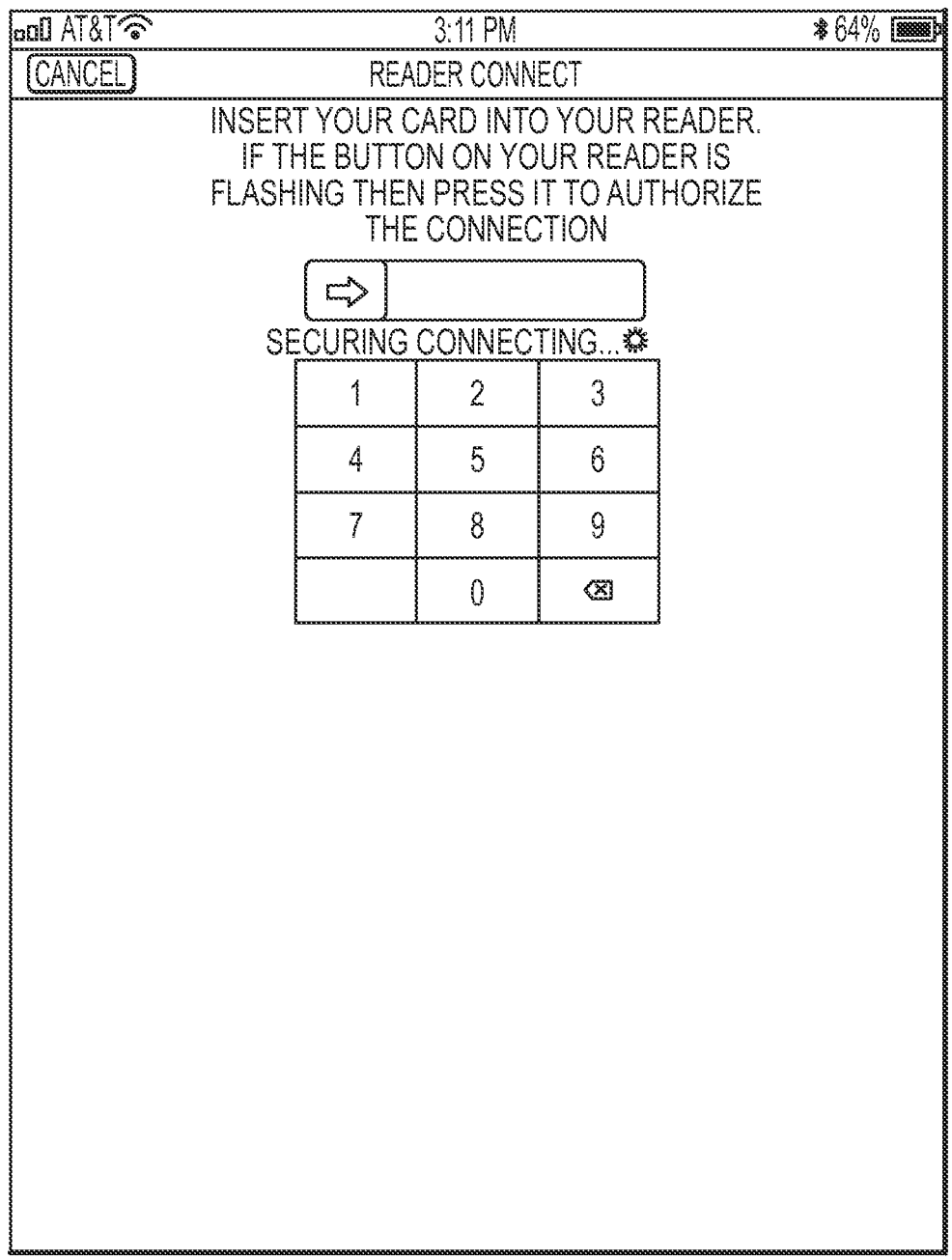
Figure 4F:
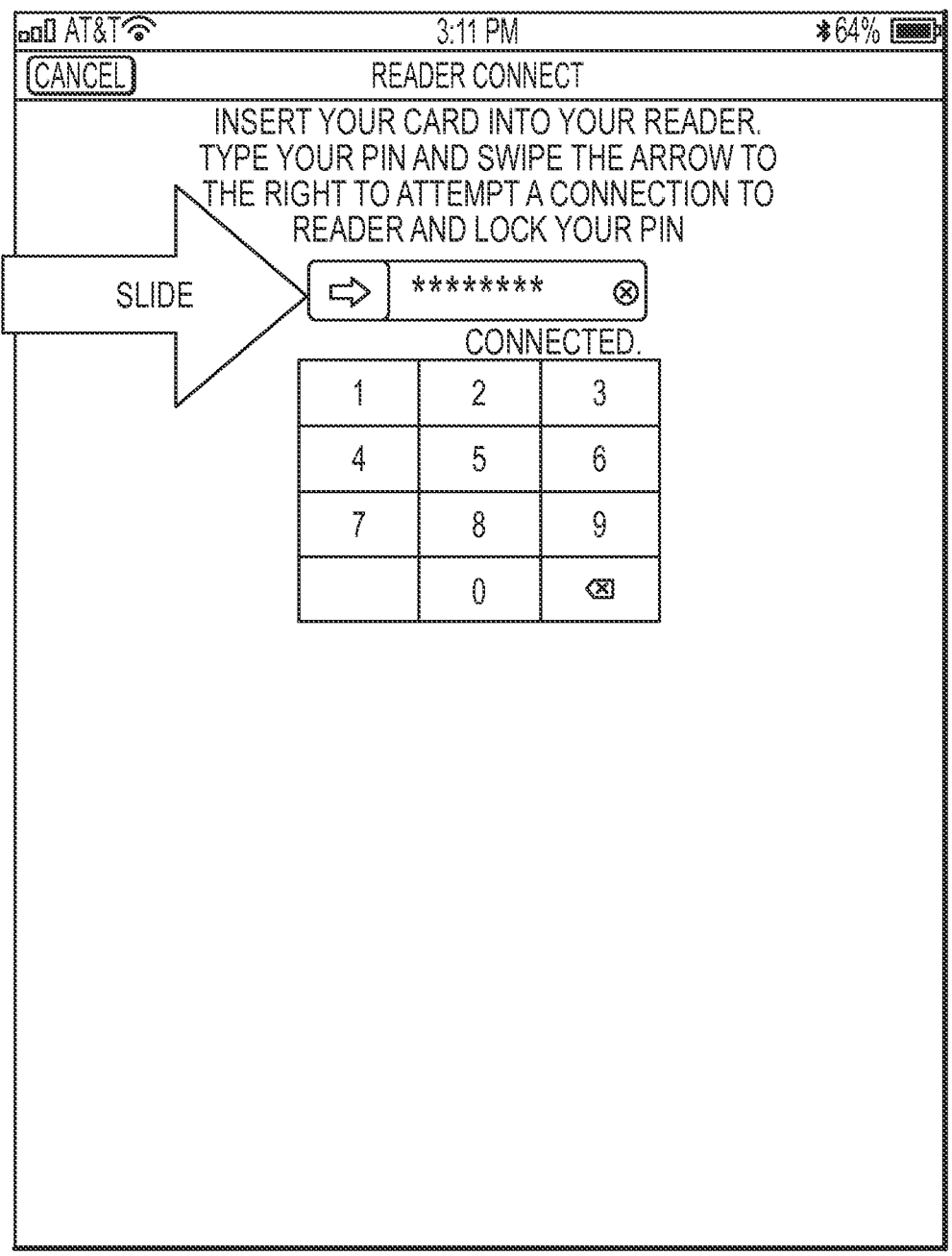
Figure 4G:
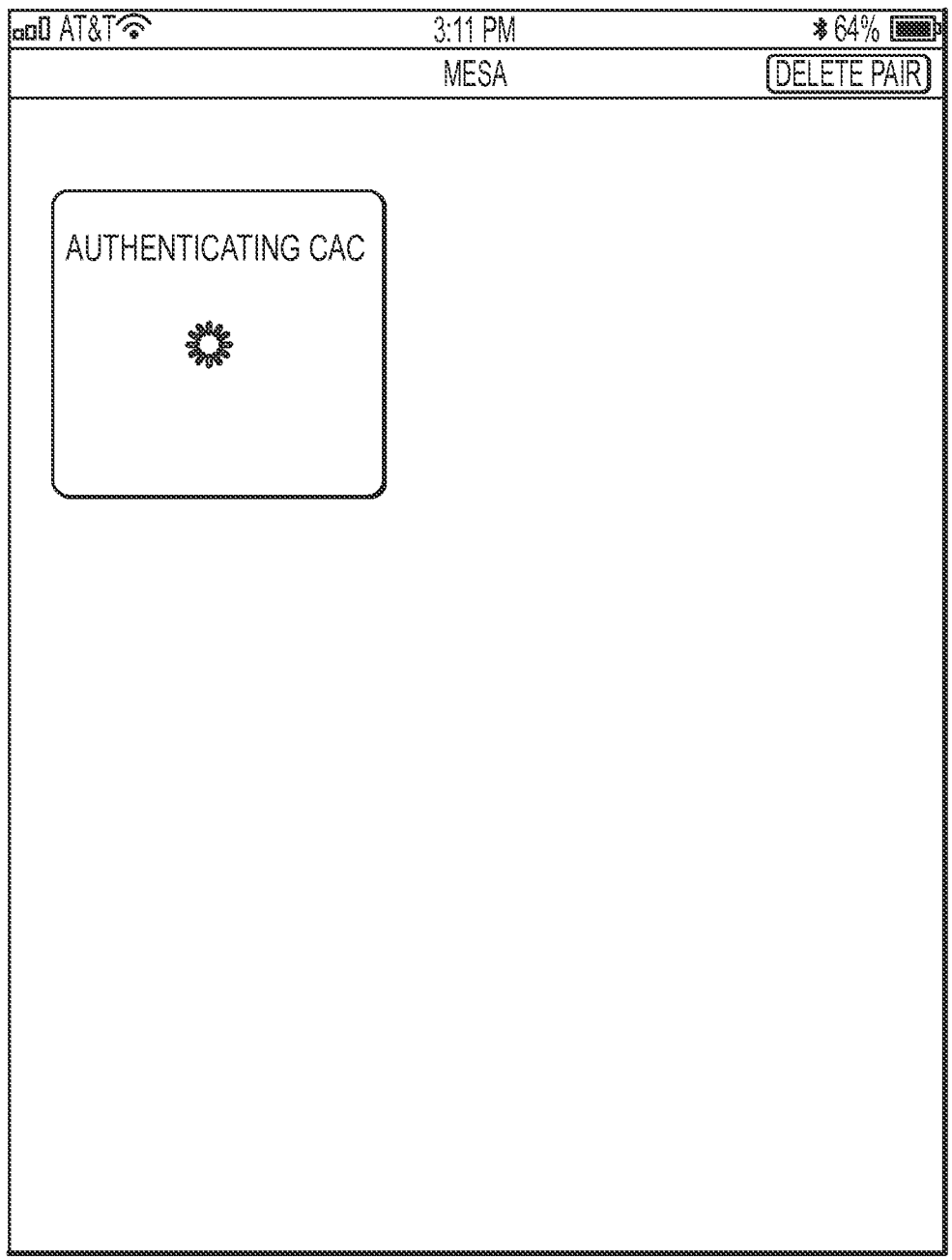
Figure 4H:
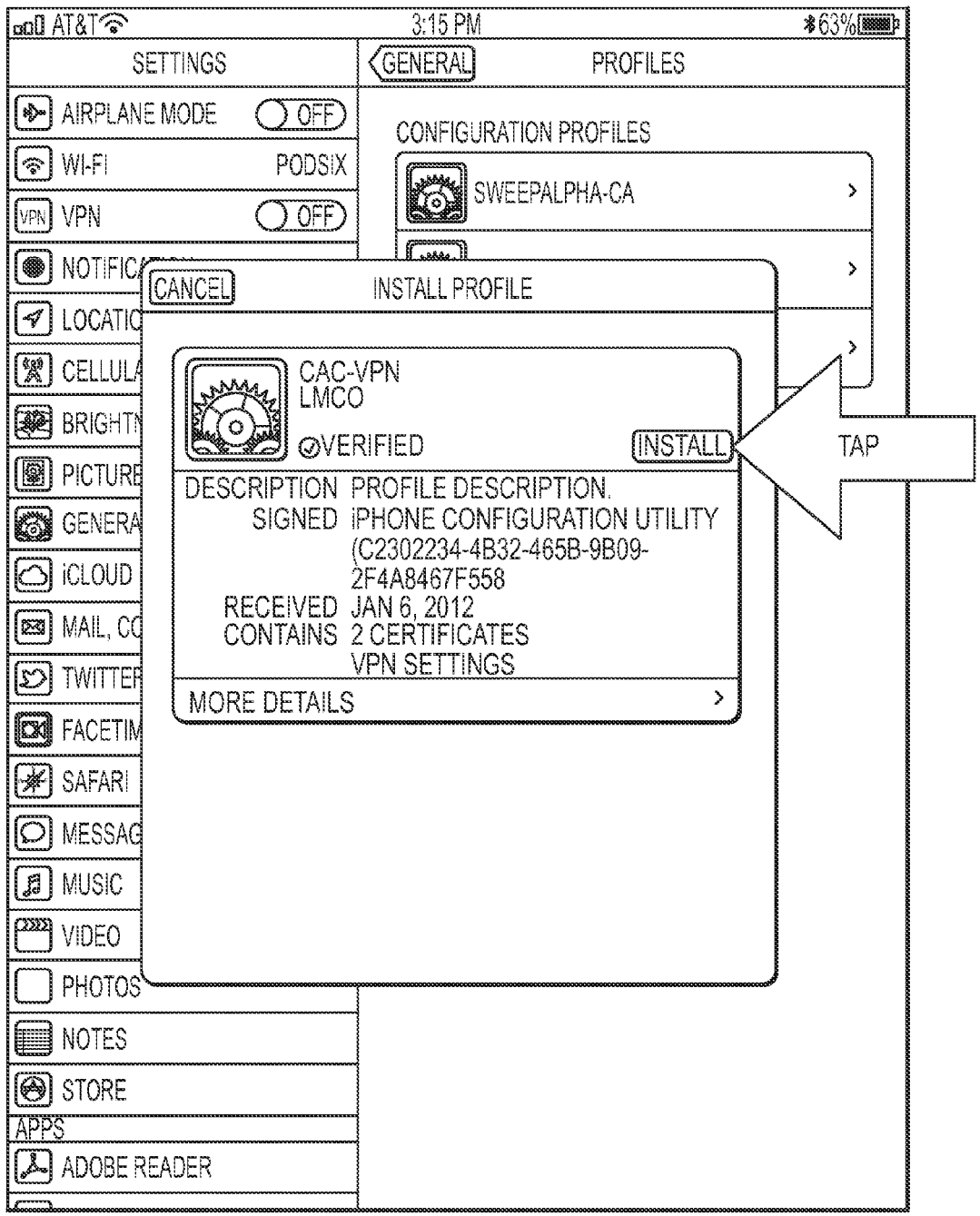
Figure 4I:
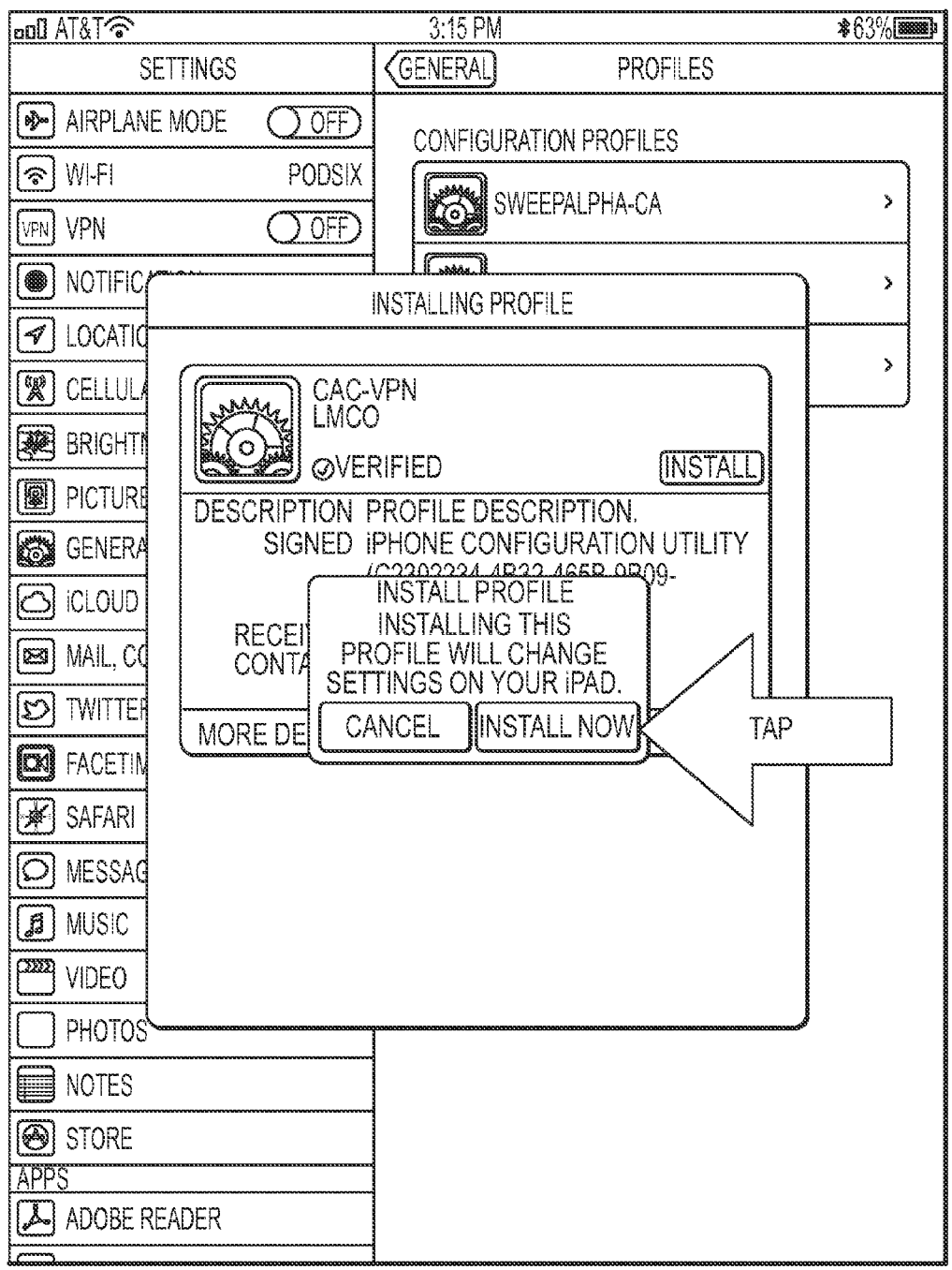
Figure 4J:
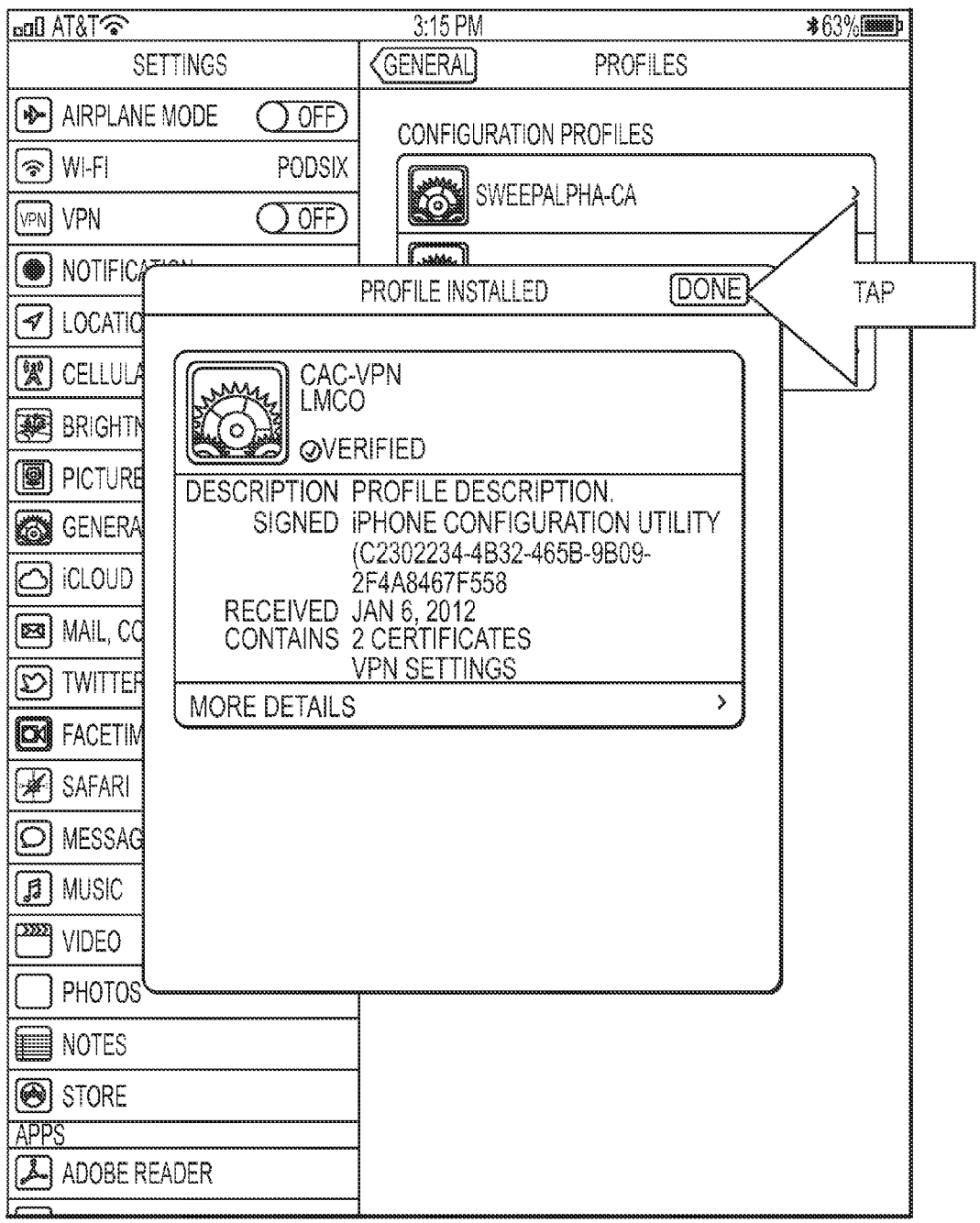
Figure 4K:
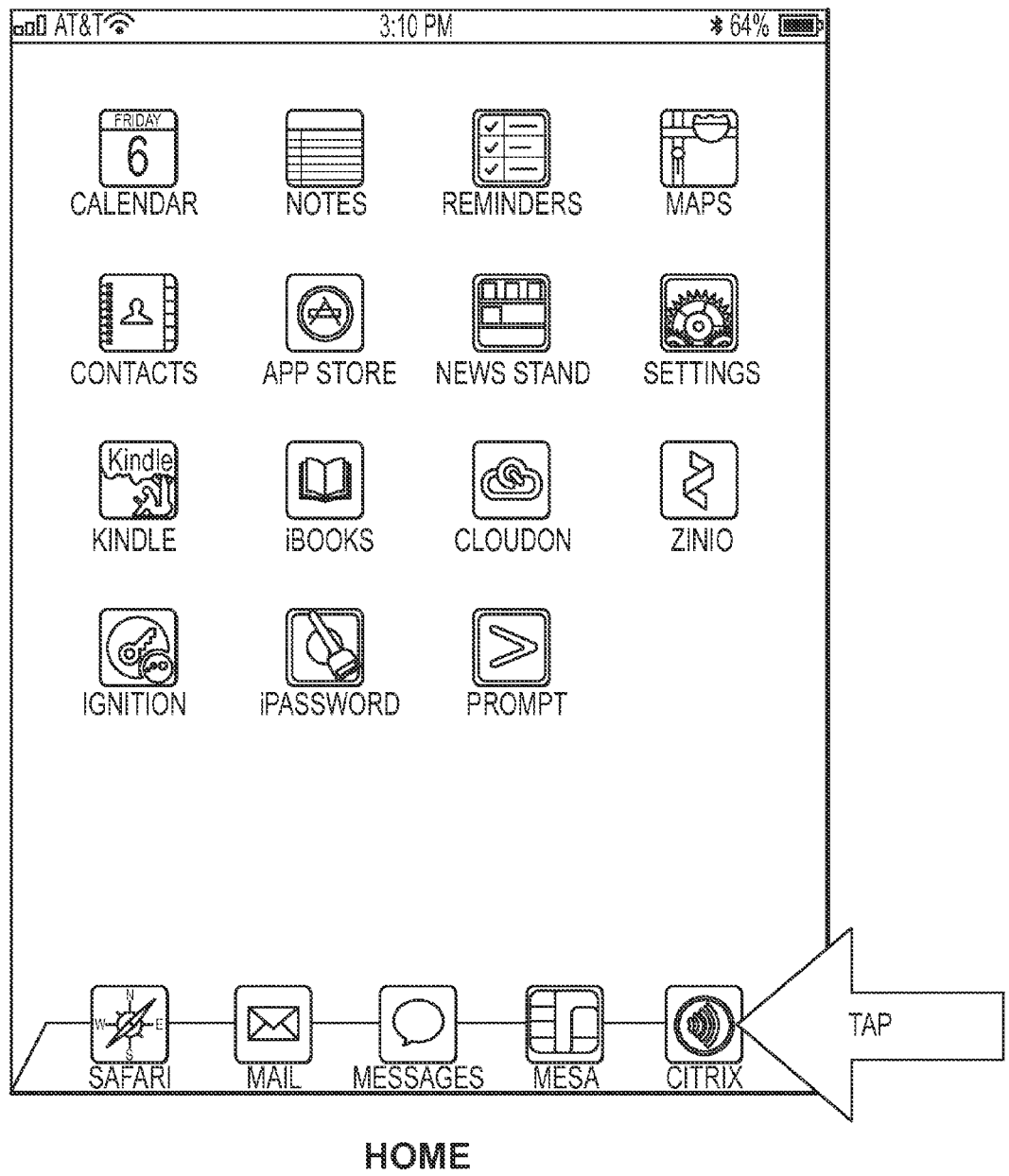
Figure 4I:
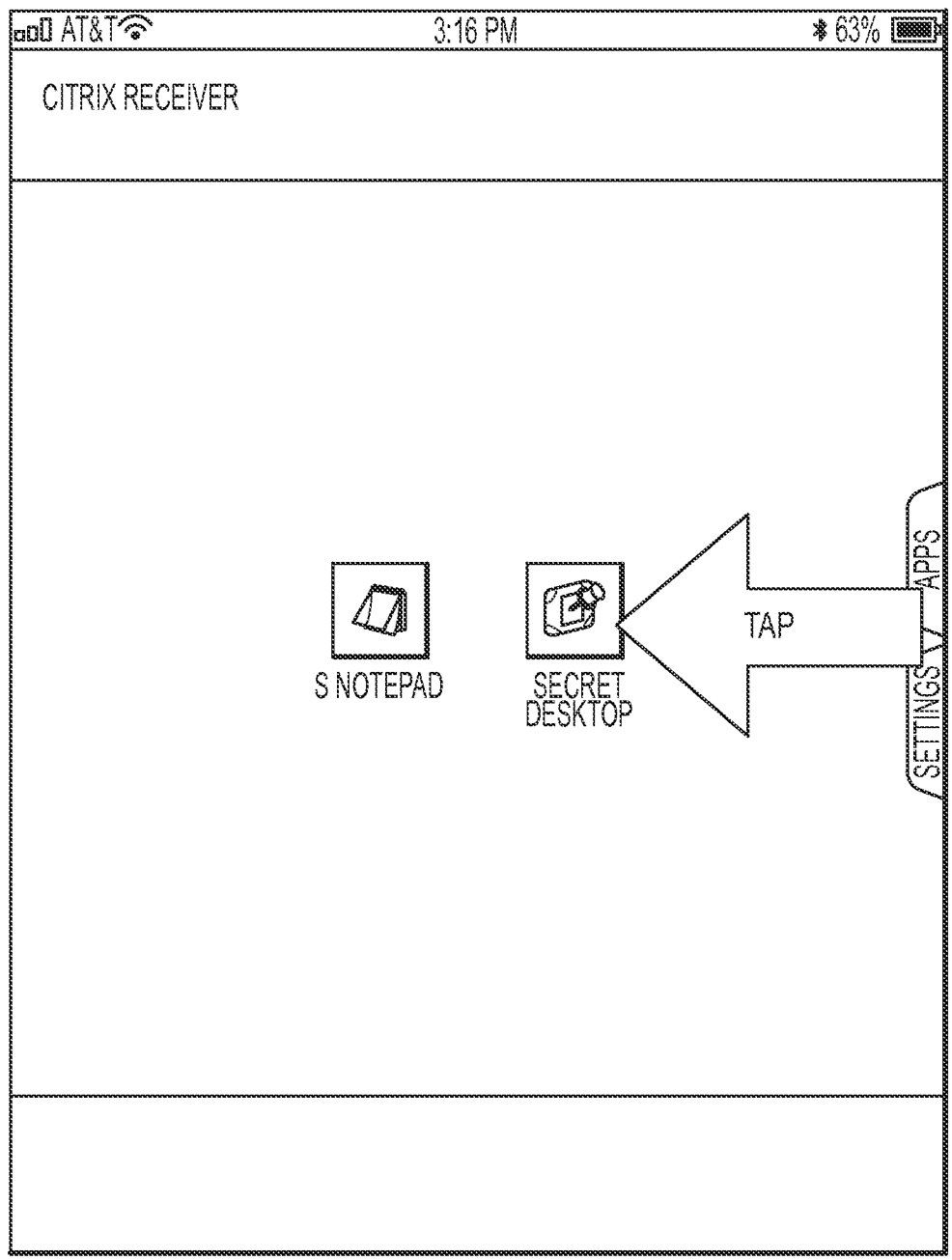
Figure 4M:
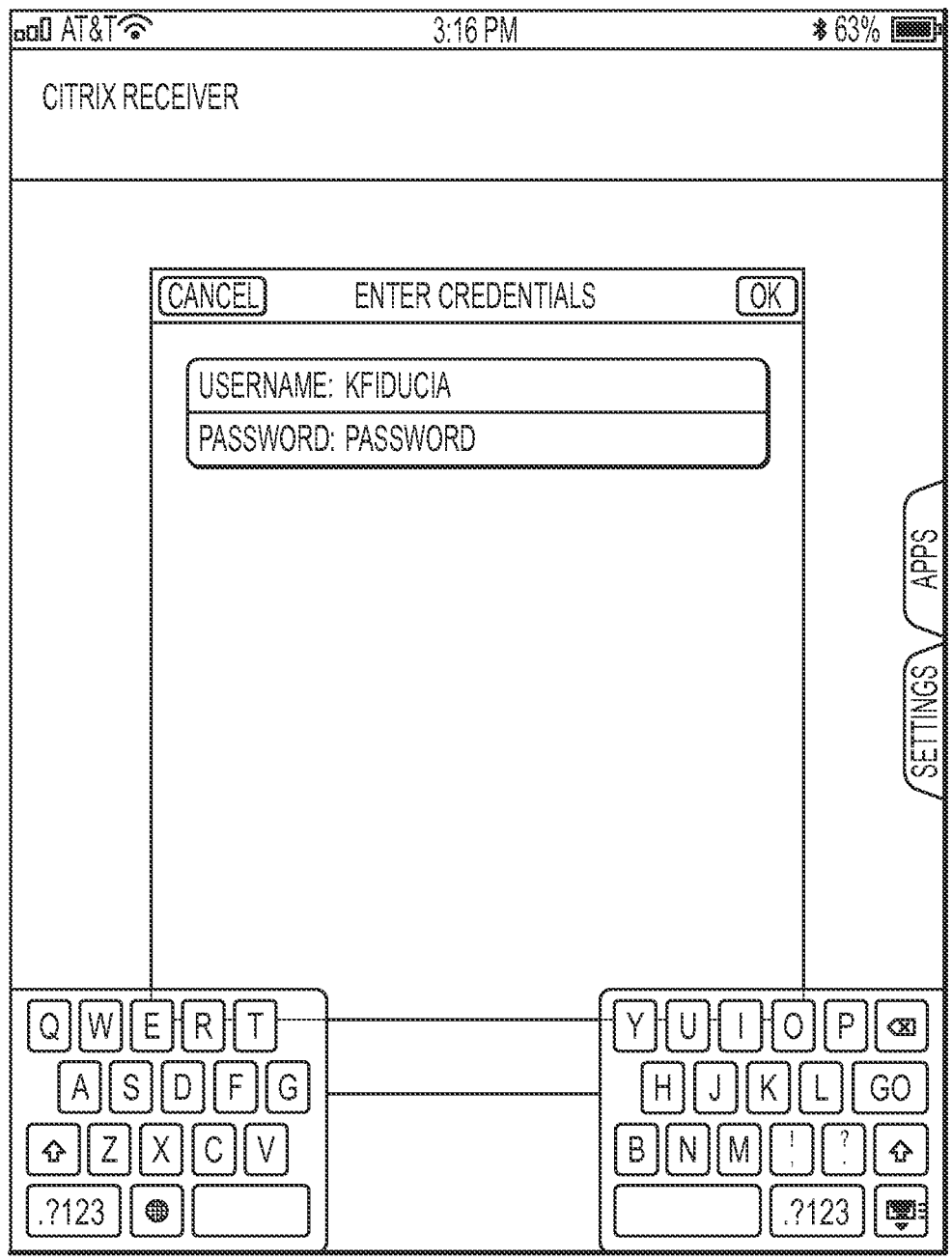
Figure 4N:
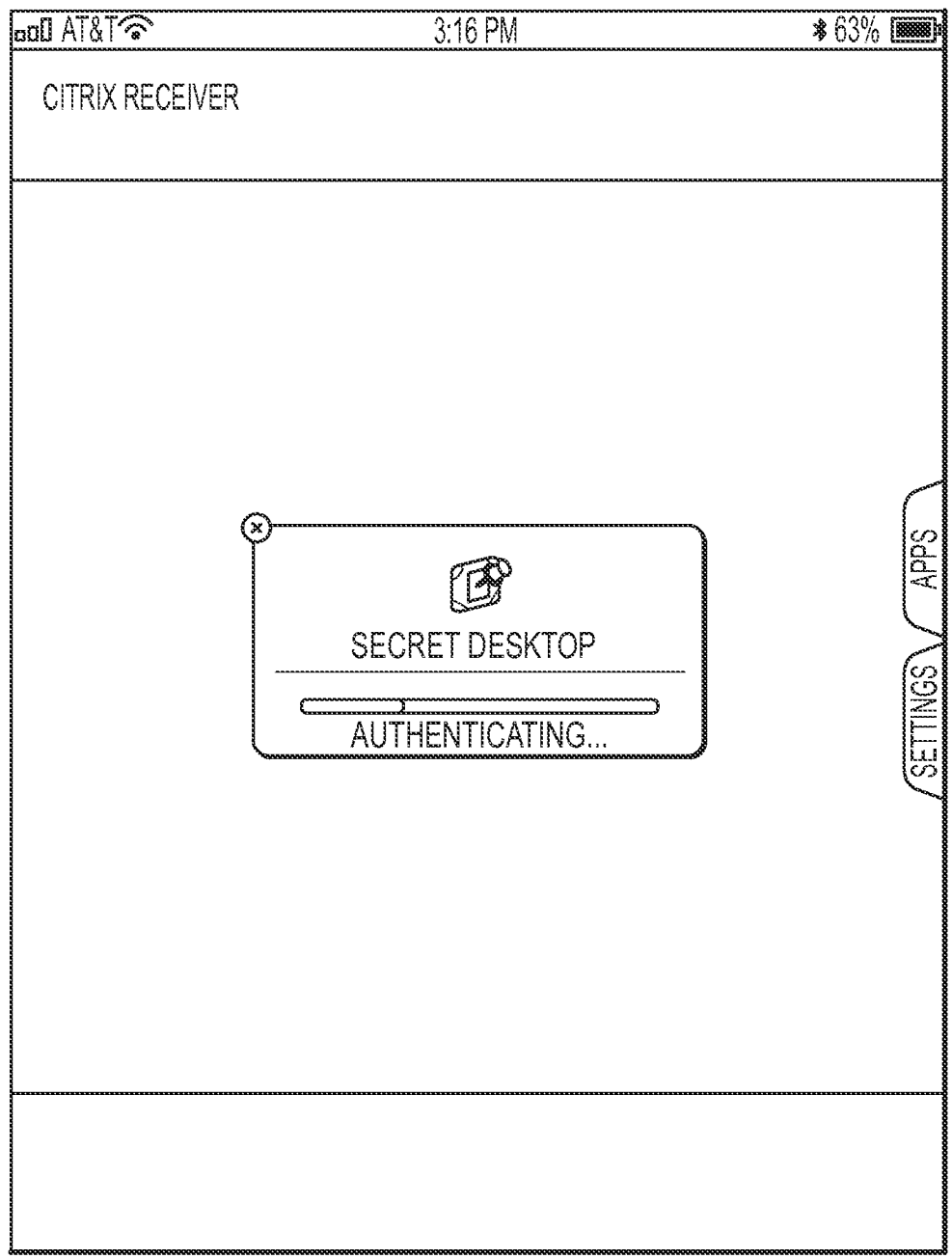
Figure 4O:
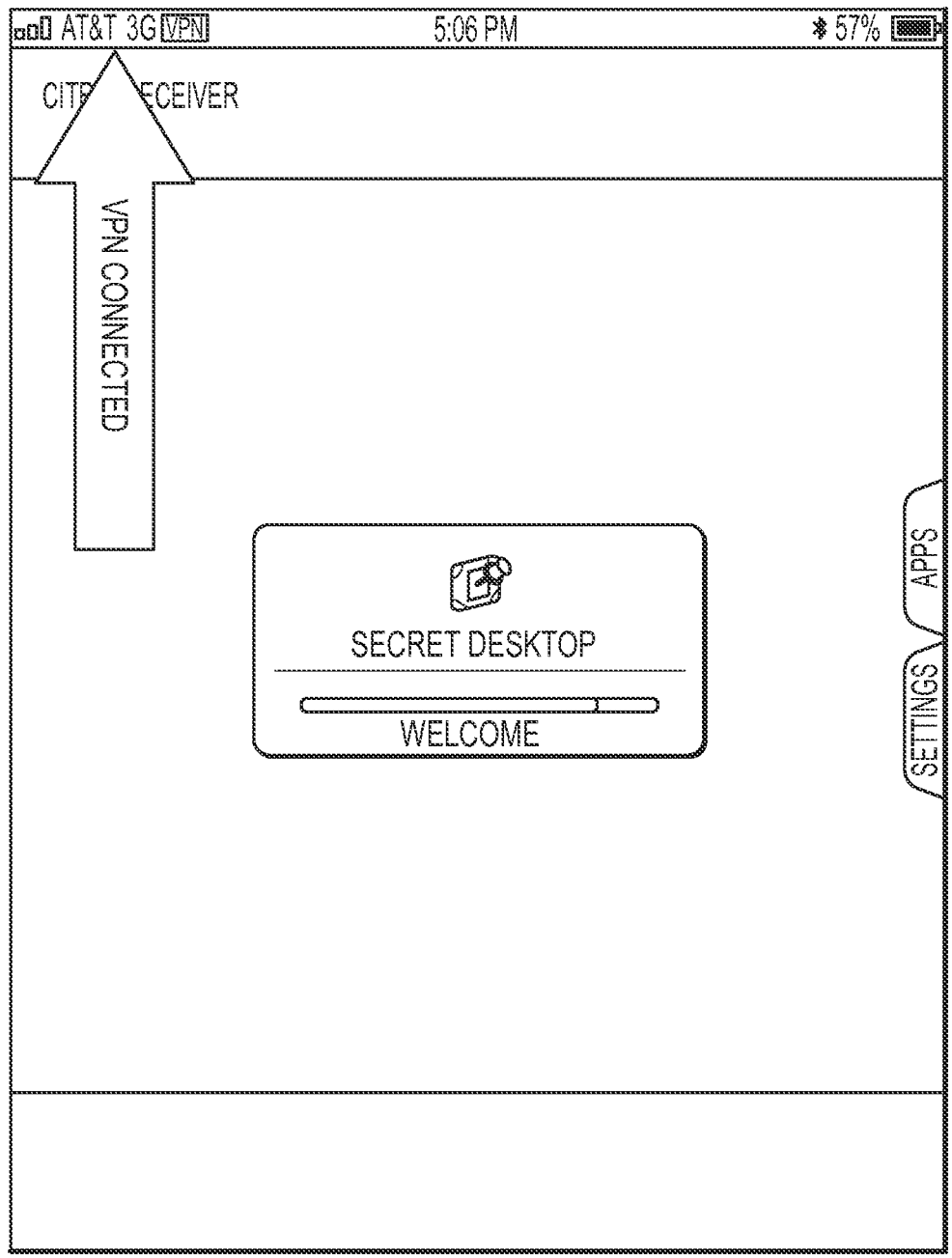
Figure 4P:
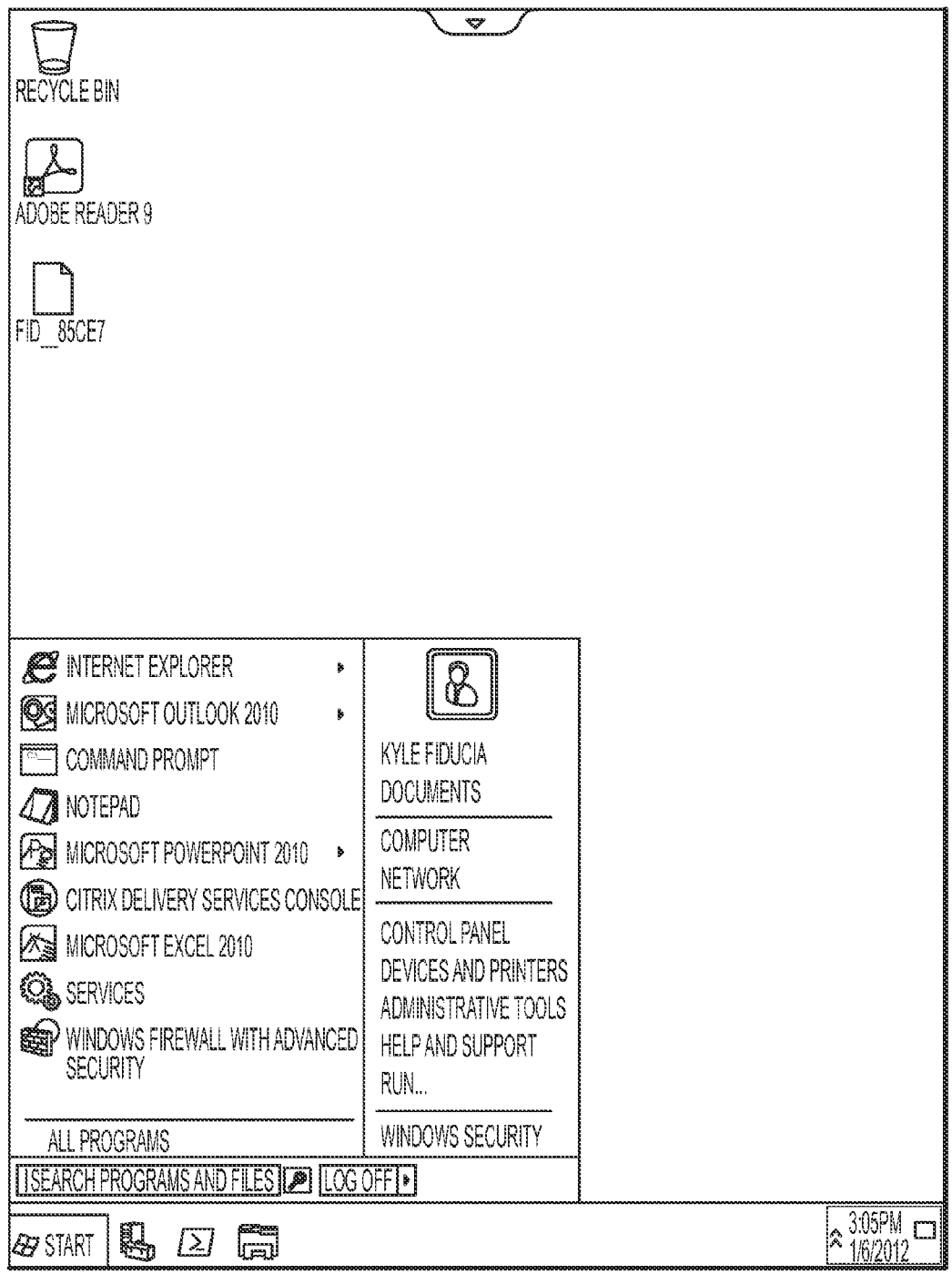

Turning now to FIGS. 4a-4p, various screenshots from a mobile device (e.g., smartphone, tablet, etc.) implementing the MESA utilities disclosed herein, according to one embodiment, are illustrated. FIG. 4a illustrates how a user may be presented with a "MESA" icon which, when manipulated (e.g., tapped, clicked), causes the MESA app (e.g., MESA app 216 of FIG. 2a) to launch and begin the MESA VPN process. As shown in FIGS. 4b-4e, a user may be prompted to connect a smart card reader (e.g., as shown, a Bluetooth Dongle) to the mobile device, opt to "authenticate," and insert a smart card into the reader whereupon an identity certificate from the smart card may be read and a connection may be made and secured. As shown in FIGS. 4f-4g, a user may be prompted to enter a PIN which may be verified (in conjunction with authentication of the smart card).

Upon validation of the user's identity certificate and permissions (e.g., via the enterprise CA server 250 and enterprise directory services 260 of FIG. 2a), a VPN certificate may be requested and generated (e.g., by the VPN CA server 270 of FIG. 2a) and a VPN profile (which may be appropriately digitally signed) including VPN certificates and configuration settings may be presented to a user for installation on the mobile device to establish a corresponding VPN connection. See FIGS. 4h-4j. As an example of one user app or program that may be launched by the user on his or her mobile device after installation of an appropriate VPN profile, a user may tap or click a "Citrix" icon on the mobile device (see FIG. 4k) and then a "Secret Desktop" icon on the mobile device (see FIG. 4l) whereupon the user may be prompted to enter credentials such as a username and a password (see FIG. 4m).

In one arrangement, the Citrix application can be directly opened upon launching of the MESA app. In any event, and as part of authenticating the entered username and password (see FIG. 4n), the VPN profile (and VPN certificate(s)) may be passed to a VPN concentrator or the like for validation of the same as well as initiation and establishment of the VPN connection (see FIG. 4o). As shown in FIG. 4p, a user may now be logged into a Citrix interface to securely access an enterprise or corporate network over a VPN connection. Additional apps can be launched on the mobile device which may cause the initiation and establishment of additional respective VPN connections.

Figure 5A:
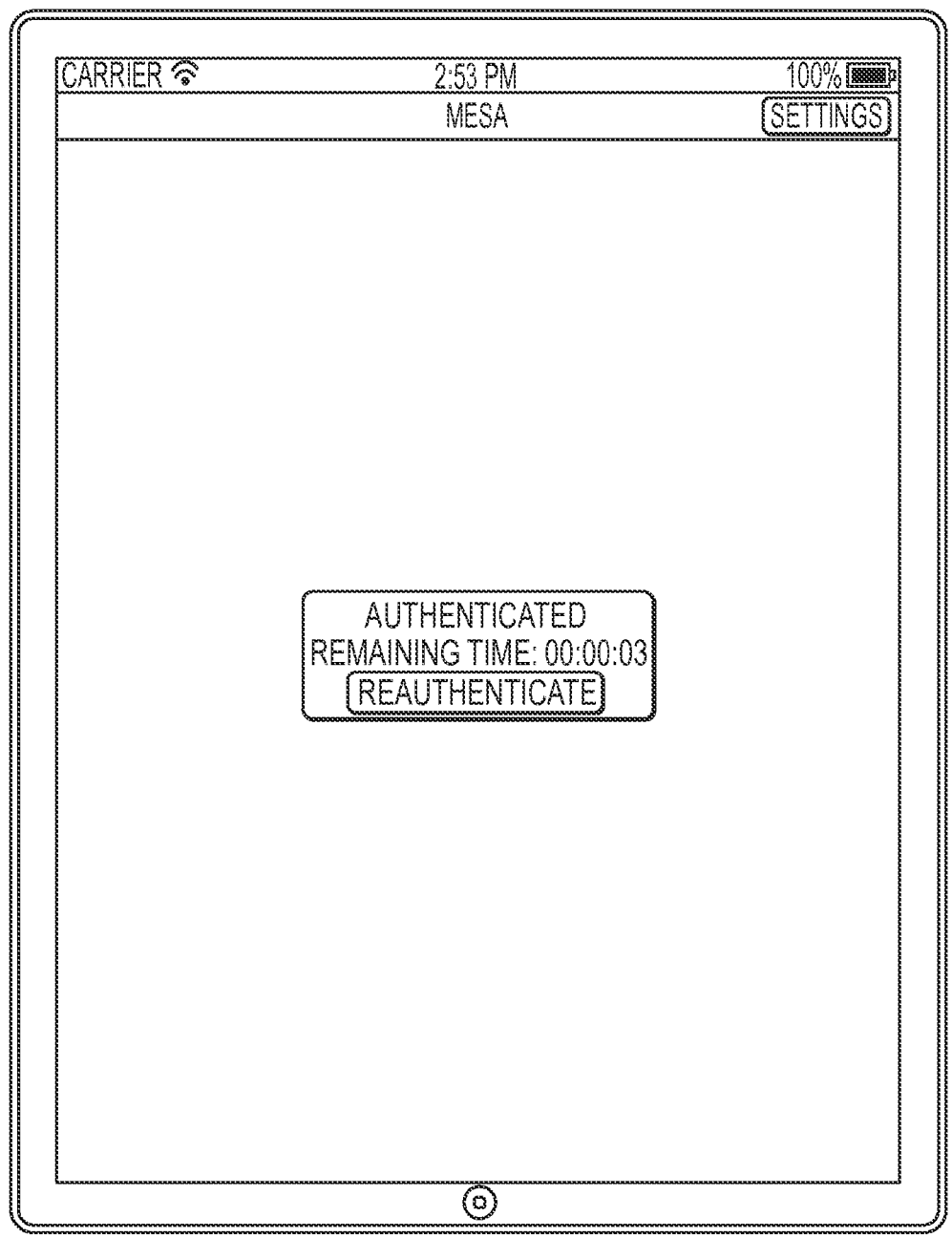
FIGS. 5a-5g are screenshots from one or more mobile devices implementing the MESA utilities disclosed herein, according to another embodiment.
Figure 5B:
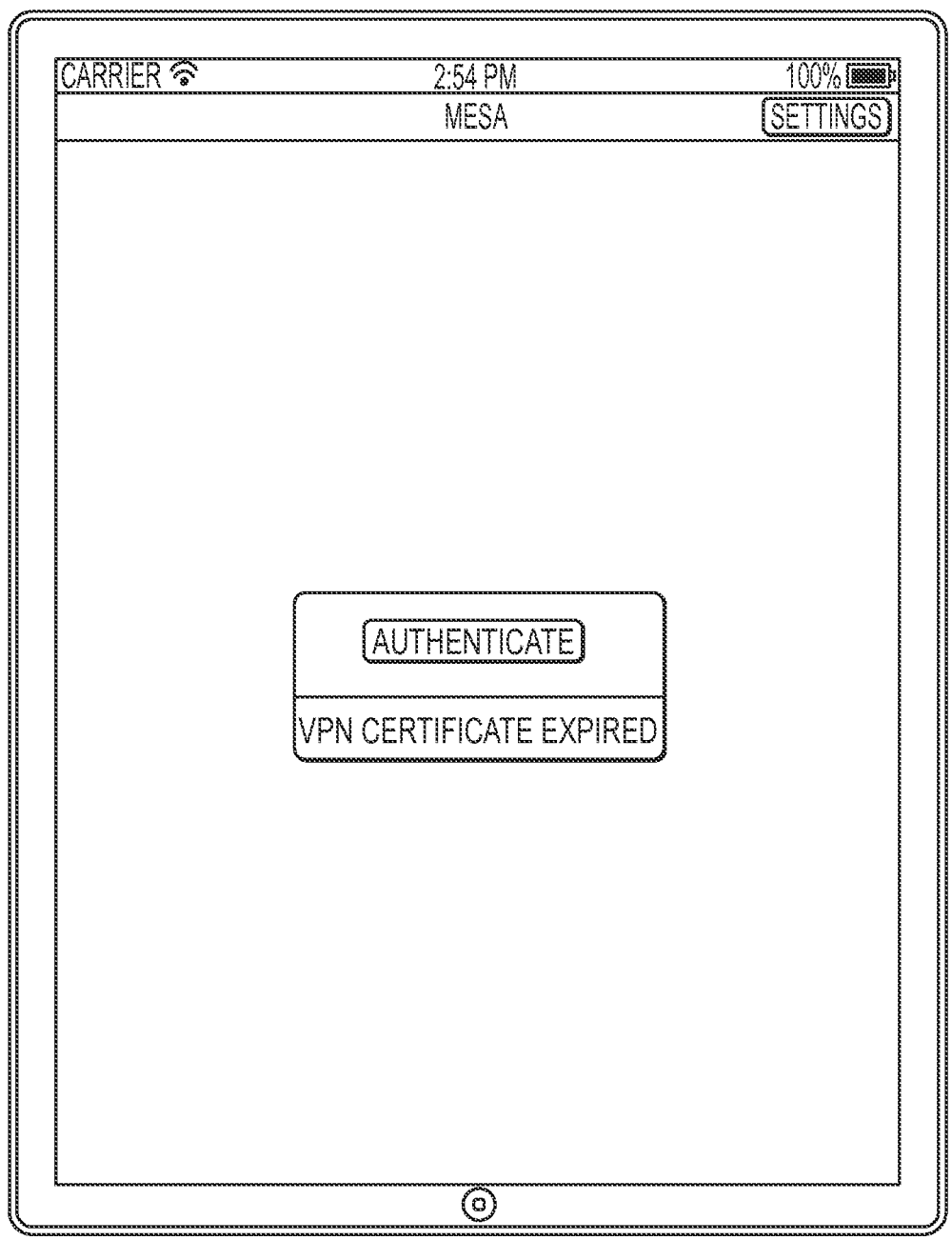

Turning now to FIGS. 5a-5g, various screenshots from one or more mobile devices (e.g., smartphones, tablets, etc.) implementing the MESA utilities disclosed herein, according to another embodiment, are illustrated. FIG. 5a illustrates a pop-up window or notification on a tablet that may be presented to a user within a MESA app indicating the remaining time that the user will still be authenticated (i.e., the remaining time that user's current VPN certificate will be valid) and providing an option to reauthenticate with the network. For instance, this window may be automatically displayed when a user's VPN certificate is to expire in less than "x" minutes or the like. FIG. 5b illustrates another pop-up window or notification alerting a user that his or her VPN certificate has expired and providing an option to authenticate with the network.

Figure 5C:
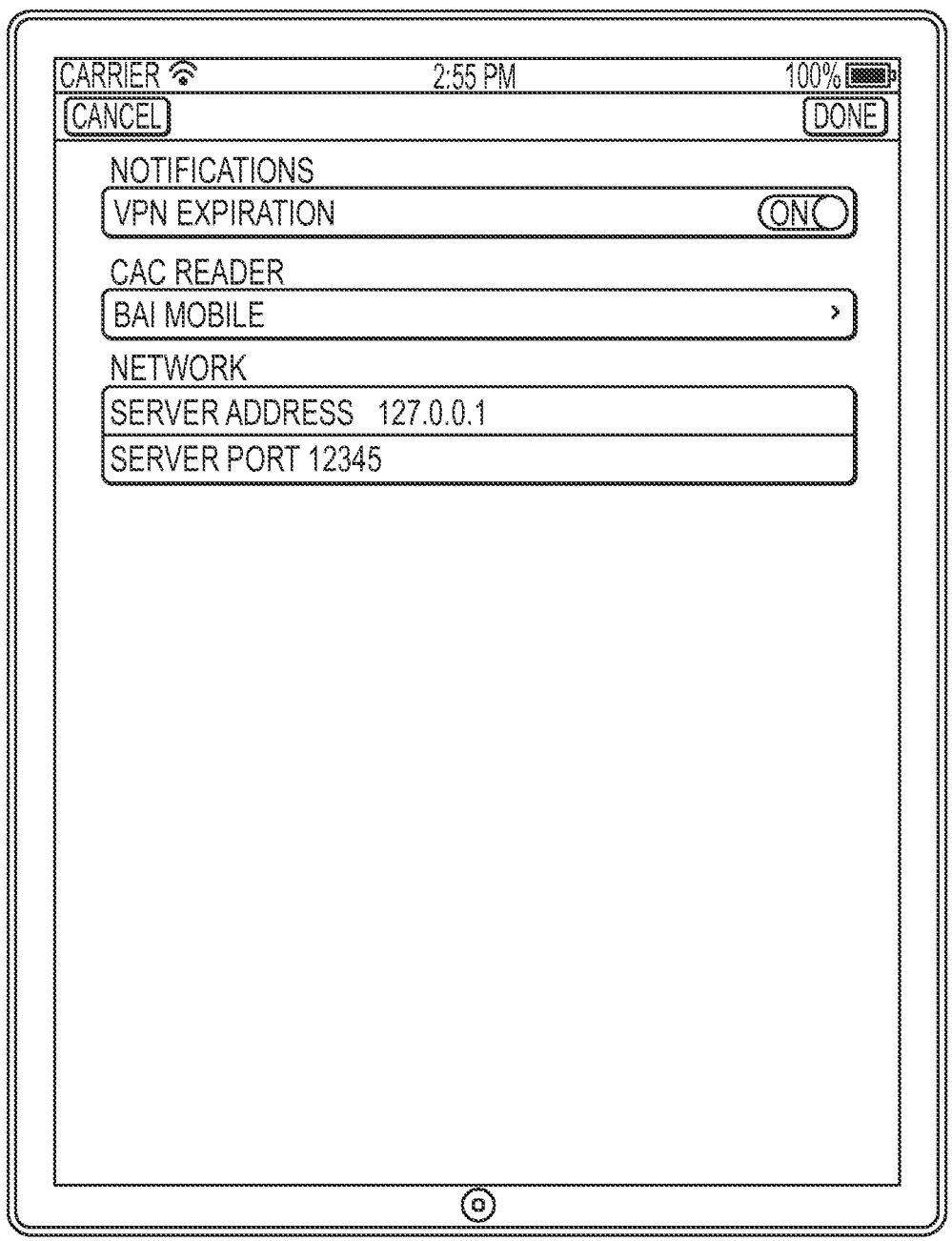
Figure 5D:
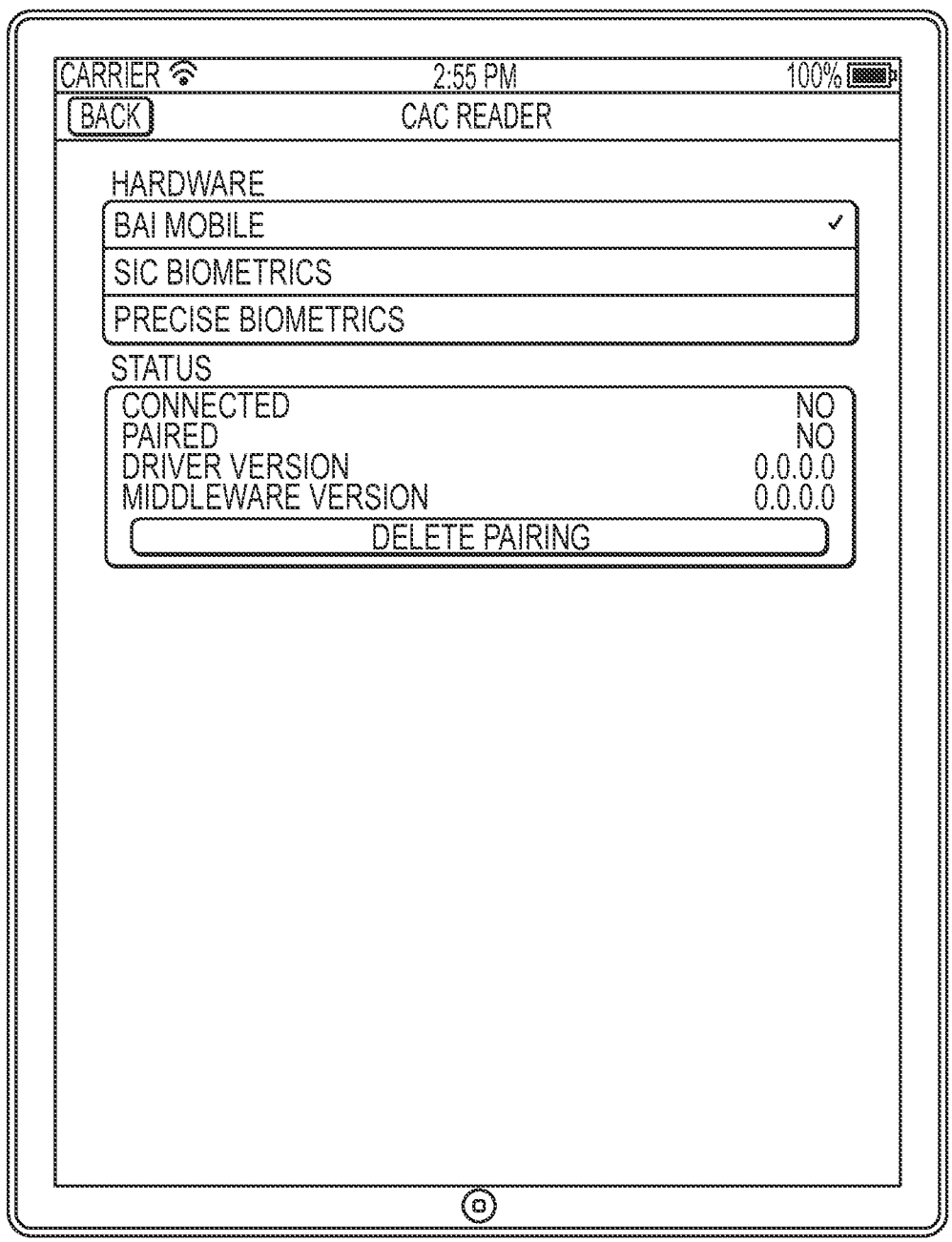
Figure 5E:
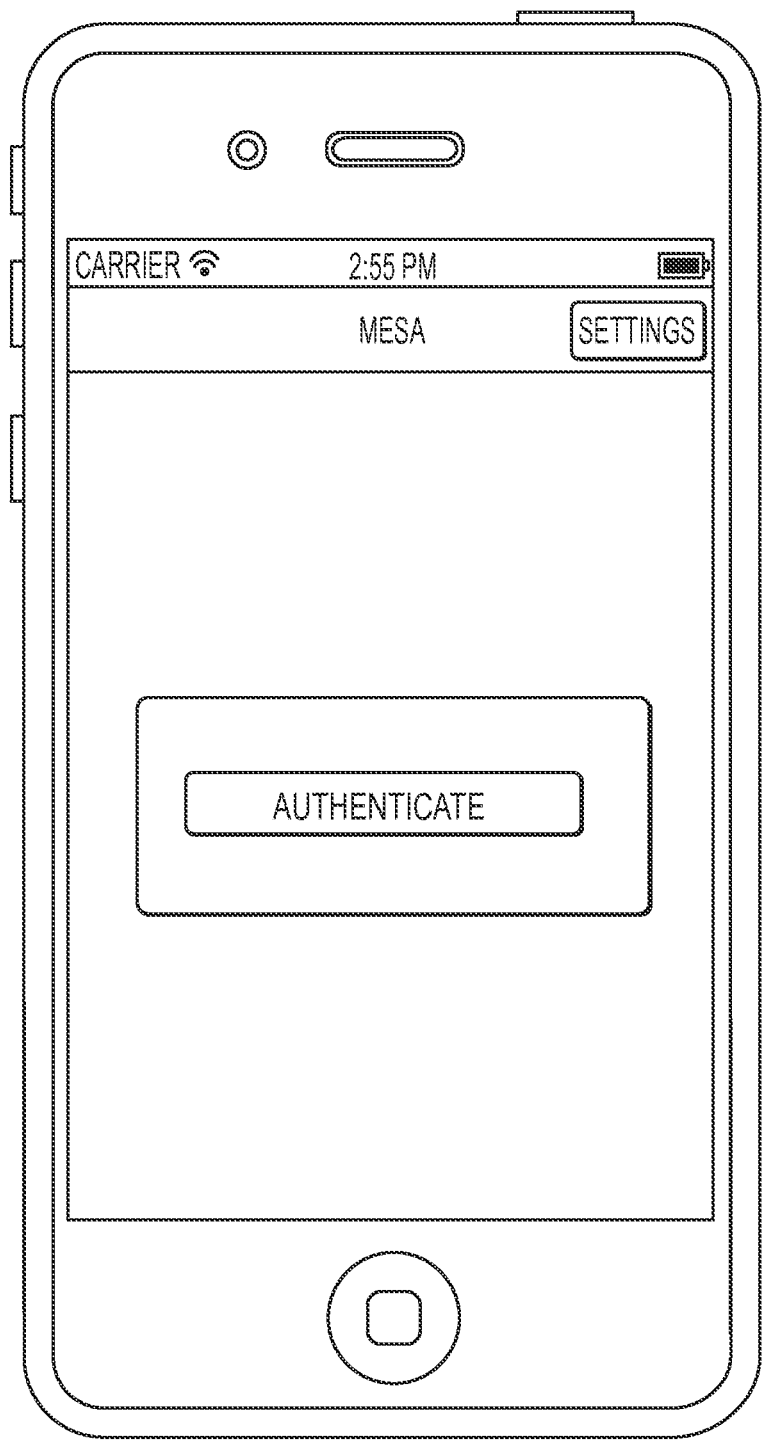
Figure 5F:
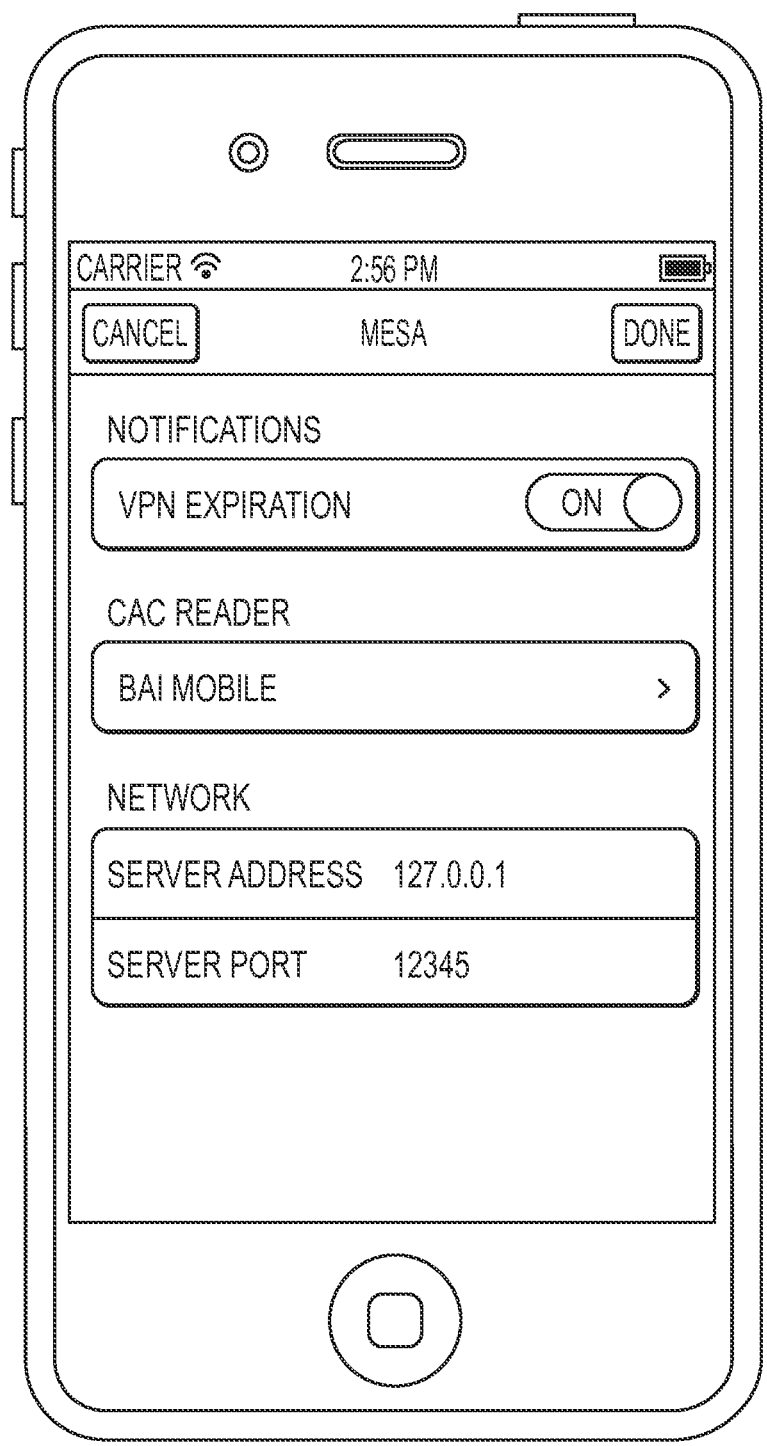
Figure 5G:
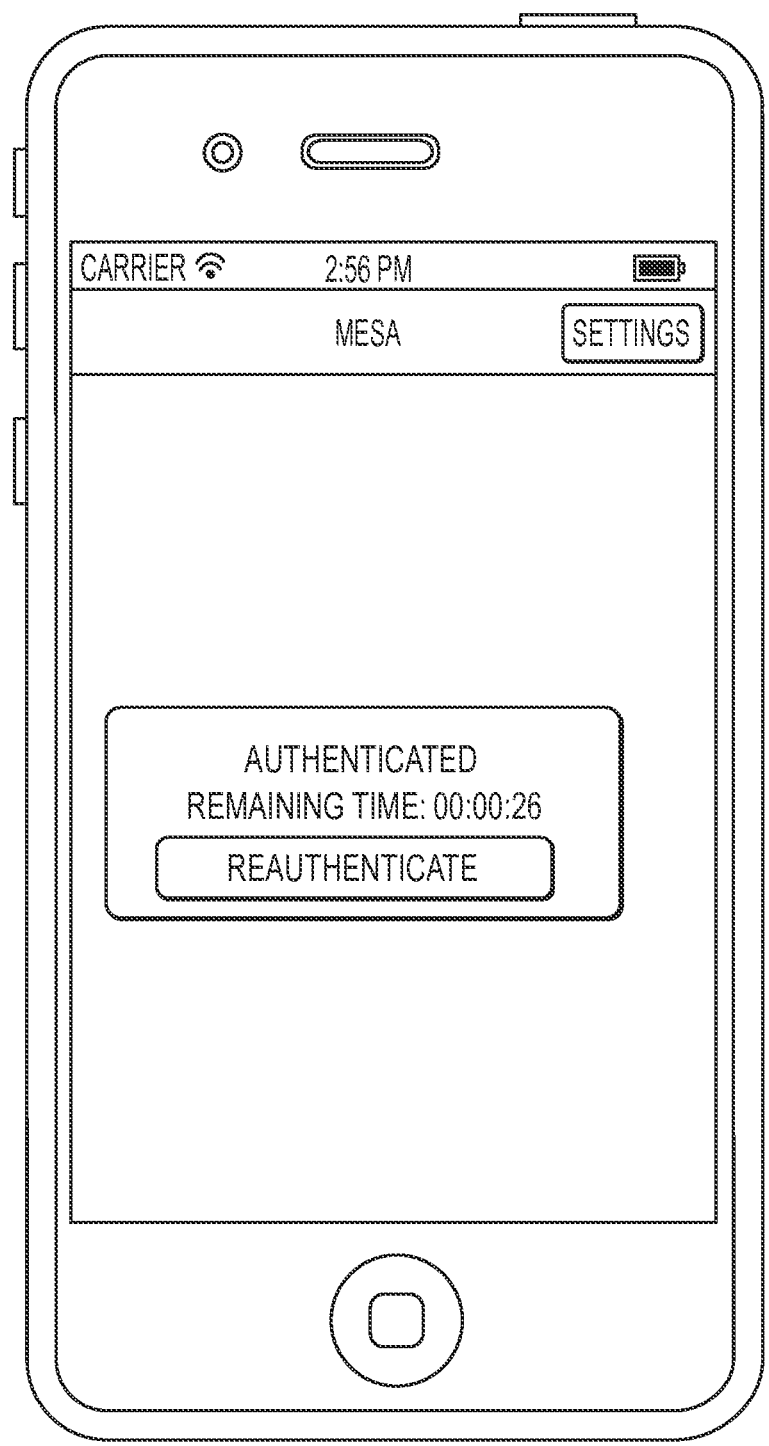

Turning to the screenshot FIG. 5c, a user may be presented with the ability to modify various MESA settings upon tapping or clicking of a "settings" or other button in the screenshots of FIG. 5a or 5b. For instance, the user may be able to turn on or off the VPN expiration and/or remaining time notifications shown in FIGS. 5a-5b. As another example, a user can configure and/or pair any appropriate card reader with the mobile device (also see FIG. 5d). The screenshots of FIGS. 5e-5g are similar to those of FIGS. 5a-5d, but are shown in the context of a smartphone instead of a tablet.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. For instance, FIG. 2b illustrates a system diagram similar to that of FIG. 2a but according to another embodiment. In this embodiment, the MESA server 200 may be configured to pass requests for VPN certificates to the MDM server 240 which may be responsible for (e.g., at the direction of the MESA server 200) passing such requests to (or otherwise making such requests from) the VPN CA 270 and then receive VPN certificates from the VPN CA 270. Furthermore, the disclosed utilities allow for the provisioning of almost any policies or apps a user may need based on the credentials provided. For example, upon a user "A" authenticating and the VPN connection being provisioned, an app "X" may be provisioned down. However, upon a user "B" authenticating, app "X" and an app "Y" may be provisioned and a policy may be changed to allow use of a certain feature on the mobile device 210. In this regard, any provisioned profiles on the mobile device 210 may be dynamically changed based on the particular user's authentication.

Embodiments disclosed herein can be implemented as one or more computer program products, (e.g., one or more modules of computer program instructions encoded on a non-transitory computer-readable medium for execution by, or to control the operation of, a data processing apparatus). For example, the logic, software, computer-readable instructions, etc. of the MESA App 216, MESA server 200, etc. configured to implement the MESA utilities disclosed herein may be provided in such computer-readable medium of the mobile device 210, 215, MESA server 200, etc. (e.g., on a circuit board) and executed by a corresponding processor or processing engine (not shown). The computer-readable medium can be a machine-readable storage device, a machine-readable storage substrate, a non-volatile memory device, a composition of matter affecting a machine-readable propagated signal, or a combination of one or more of them. In this regard, the system diagrams of FIGS. 2a-2b may encompass one or more apparatuses, devices, and machines for processing data, including by way of example a programmable processor, a computer, or multiple processors or computers. In addition to hardware, the system may include code that creates an execution environment for the computer programs in question, e.g., code that constitutes processor firmware, a protocol stack, a database management system, an operating system, or a combination of one or more of them.

A computer program (also known as a program, software, software application, script, or code) used to provide any of the functionalities described herein can be written in any appropriate form of programming language including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit). Processors suitable for the execution of a computer program may include, by way of example, both general and special purpose microprocessors, and any one or more processors of any kind of digital computer. Generally, a processor will receive instructions and data from a read-only memory or a random access memory or both. Generally, the elements of a computer are one or more processors for performing instructions and one or more memory devices for storing instructions and data. The techniques described herein may be implemented by a computer system configured to provide the functionality described.

While this disclosure contains many specifics, these should not be construed as limitations on the scope of the disclosure or of what may be claimed, but rather as descriptions of features specific to particular embodiments of the disclosure. Furthermore, certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

While various embodiments of the present invention have been described in detail, further modifications and adaptations of the invention may occur to those skilled in the art. However, it is to be expressly understood that such modifications and adaptations are within the spirit and scope of the present invention.

What is claimed is:

1. A method for use in multi-factor authentication to an enterprise network, comprising:

launching an application on a user's mobile device that prompts the user to enter a first authentication factor;

validating the first authentication factor by a smart card connected with a reader interface of the mobile device;

upon validation of the first authentication factor, generating a digital signature of the user by the smart card with a private key in the smart card;

first receiving, at the user's mobile device, an identity certificate and the digital signature of the user from the smart card connected with the reader interface of the mobile device;

passing the identity certificate and digital signature from the mobile device to a central management server over at least one network;

second receiving, at the user's mobile device, a Virtual Private Network (VPN) certificate to access the enterprise network via a VPN connection in response to the passing;

initiating, from the mobile device, the VPN connection using the VPN certificate, wherein the initiating comprises launching, on the user's mobile device, an application and requesting, in response to the launching, validation of the VPN certificate, wherein the VPN connection is initiated based on a result of the requesting; and receiving, on the user's mobile device, user credentials, wherein the user credentials are included in the VPN certificate validation request.

2. The method of claim 1, wherein the second receiving further includes:
   receiving a VPN profile associated with the VPN certificate; and
   installing the VPN profile on the user's mobile device, wherein a type of the received user credentials is specified in the installed VPN profile.

3. The method of claim 2, wherein the received user credentials type comprises a username and a password.

4. The method of claim 2, wherein the installed VPN profile comprises configuration settings for the VPN connection.

5. The method of claim 4, wherein the VPN connection configuration settings comprise at least one of a VPN server, a VPN type, and an on-demand address.

6. The method of claim 1, further comprising:
   receiving a request to deauthenticate the VPN session.

7. The method of claim 6, wherein the deauthentication request comprises:
   sensing removal of the smart card from the user's mobile device.

8. The method of claim 1, wherein the initiating comprises:
   sending the VPN certificate to a VPN concentrator, wherein the VPN concentrator
   validates the VPN certificate with a VPN certificate authority server.

9. The method of claim 1, wherein the VPN certificate is received from a Mobile Device Management (MDM) server.

10. The method of claim 9, wherein the MDM server is disjoint from the central management server.

11. A method for use in multi-factor authentication to an enterprise network, comprising:
   first receiving, at a management server over at least one network, credentials verifying at least one of at least two authentication factors from a user via a mobile device, wherein the credentials include an identity certificate and digital signature of the user from a smart card connected with a reader interface of the mobile device, and wherein the digital signature is generated by the smart card with a private key in the smart card upon authentication of a first authentication factor entered by the user of the mobile device;
   first sending, from the management server to a first Certificate Authority (CA) server, a request to validate the credentials verifying at least one of the at least two authentication factors;
   second sending, from the management server, a request for a virtual private network (VPN) certificate to access the enterprise network via a VPN connection from a second CA server based on whether the request was validated in the first sending;
   initiating, from the mobile device, the VPN connection using the VPN certificate, wherein the initiating comprises launching, on the user's mobile device, an application and requesting, in response to the launching, validation of the VPN certificate, wherein the VPN connection is initiated based on a result of the requesting; and
   receiving, on the user's mobile device, user credentials, wherein the user credentials are included in the VPN certificate validation request.

12. The method of claim 11, further comprising:
   third sending, from the management server to an enterprise directory server, a request to validate user permissions associated with the credentials verifying at least one of the at least two authentication factors, wherein the second sending is responsive to successful validation of the first and third sending.

13. The method of claim 11, wherein the second sending comprises sending the VPN connection request from the management server to the second CA server, and wherein the method further comprises:
   second receiving, at the management server from the second CA server, the VPN certificate; and
   transmitting the VPN certificate from the management server to a Mobile Device Management (MDM) server, wherein the VPN certificate is pushed from the MDM server to the mobile device.

14. The method of claim 13, wherein the transmitting further includes:
   communicating configuration settings for the VPN connection to the MDM server, wherein the MDM server generates a VPN profile including the VPN connection configuration settings and pushes the VPN profile with the VPN certificate to the mobile device.

15. The method of claim 14, wherein the VPN connection configuration settings comprise at least one of a VPN server, a VPN type, and an on-demand address.

16. The method of claim 13, wherein the second CA server associates the VPN certificate with the user in a directory service of the enterprise network.

17. A multi-factor authentication system for allowing access by a user to an enterprise network over a virtual private network (VPN) connection with a mobile device, comprising:
   a smart card including an identity certificate of the user;
   a mobile device including a processor, a reader interface to which the smart card is connectable, and a client application configured to run on the mobile device, wherein the client application is executable by the processor of the mobile device to:
   prompt the user to enter a first authentication factor;
   first receive the identity certificate of the user from the smart card when the smart card is connected with the reader interface of the mobile device; and
   second receive a digital signature of the user generated by the smart card with a private key in the smart card upon validation of the first authentication factor by the smart card;
   a central management server of the enterprise network in communication with the client application over at least one network, wherein the central management server is configured to:
   receive the identity certificate and digital signature from the client application via at least one network;
   first send a request to a first Certificate Authority (CA) server to validate the identity certificate;
   second send a request for a VPN certificate from a second CA server that allows the mobile device to establish a VPN connection into the enterprise network by the mobile device; and
   an operating system configured to run on the user's mobile device, wherein the operating system is executable by a processor of the mobile device to:
   receive the VPN certificate;
   initiate the VPN connection using the VPN certificate;
   request, in response to launching of a user application, validation of the VPN certificate, wherein the VPN connection is initiated based on a result of the validation request; and
   receive, on the user's mobile device, user credentials, wherein the user credentials are included in the VPN certificate validation request.

18. The system of claim 17, wherein the central management server is further configured to:
send the VPN certificate request to the second CA server;
receive the VPN certificate from the second CA server; and
transmit the VPN certificate to a mobile device management (MDM) server configured to coordinate communication of the VPN certificate to the operating system of the user's mobile device.

19. The system of claim 17, wherein the central management server is further configured to send the VPN certificate request to a mobile device management (MDM) server that is configured to request the VPN certificate from the second CA server, receive the VPN certificate, and coordinate communication of the VPN certificate to the operating system of the user's mobile device.

* * * * *